United States Patent

Dell et al.

[15] 3,638,185

[45] Jan. 25, 1972

[54] HIGH-DENSITY PERMANENT DATA STORAGE AND RETRIEVAL SYSTEM

[72] Inventors: Harold R. Dell, Palo Alto; Masao Hashiguchi, Mt. View; Edward D. Lara, Cupertino, all of Calif.

[73] Assignee: Precision Instrument Company, Palo Alto, Calif.

[22] Filed: Mar. 17, 1969

[21] Appl. No.: 807,551

[52] U.S. Cl. .....................340/146.1, 235/153, 340/173 LT, 346/108

[51] Int. Cl. ........................................................G11c 29/00

[58] Field of Search .................340/146.1, 173 LT; 235/153; 346/108; 250/199

[56] References Cited

UNITED STATES PATENTS

| | | | |
|---|---|---|---|
| 3,216,004 | 11/1965 | Herriott | 346/108 X |
| 3,242,461 | 3/1966 | Silberg et al. | 230/146.1 |
| 3,293,655 | 12/1966 | McNaney | 346/108 |
| 3,335,409 | 8/1967 | Heller et al. | 340/146.1 X |
| 3,465,352 | 9/1969 | Carlson et al. | 346/108 X |
| 3,474,459 | 10/1969 | Silverman | 346/108 |

*Primary Examiner*—Charles E. Atkinson
*Attorney*—Townsend & Townsend

[57] ABSTRACT

A digital data processing system for transferring digital data from a data channel of the central processor of a computing system or from a temporary storage medium to a high-density laser data recording medium and for nondestructively reproducing the data stored in the high-density medium in a form suitable for transfer to a computer data channel or temporary storage for subsequent use. Input data is transferred into a buffer and control subsystem. This subsystem generates synchronous clock signals and data verification signals which are interleaved with the input data and the composite signal thus produced is recorded on the high-density storage medium. Each recorded bit is checked to insure accuracy of recording at the instant of recording that bit, and remedial action is automatically initiated in the event of error. This remedial action consists of recording a completely unambiguous error indication signal, and re-recording the affected data in such a manner that the final record provides sufficient information to permit correction of all recording errors. During readout the retrieved data is transferred from the high-density storage medium into the buffer and control subsystem for verification of the data. If the data is correct, the synchronous clock and data verification signals are stripped from the output data, the data is reorganized into its original format, and transferred to a computer data channel or other storage medium for subsequent use. If during readout an error is detected, remedial action is automatically initiated before the data is transferred. The buffer and control subsystem includes self-checking diagnostic circuits for detecting and localizing malfunctions in all portions of the high-density data storage and data conversion system.

13 Claims, 41 Drawing Figures

INVENTORS
HAROLD R. DELL
MASAO HASHIGUCHI
EDWARDO D. LARA

BY Townsend and Townsend
ATTORNEYS

INVENTORS
HAROLD R. DELL
MASAO HASHIGUCHI
EDWARDO D. LARA
BY
Townsend and Townsend
ATTORNEYS

INVENTOR.
HAROLD R. DELL
MASAO HASHIGUCHI
EDWARDO D. LARA

BY Townsend and Townsend
ATTORNEYS

PATENTED JAN 25 1972

3,638,185

SHEET 04 OF 20

INVENTORS

BY

HAROLD R. DELL
MASAO HASHIGUCHI
EDWARDO D. LARA

Townsend and Townsend
ATTORNEYS

INVENTORS

HAROLD R. DELL
MASAO HASHIGUCHI
EDWARDO D. LARA

BY

Townsend and Townsend
ATTORNEYS

INVENTORS
HAROLD R. DELL
MASAO HASHIGUCHI
EDWARDO D. LARA

BY

Townsend and Townsend
ATTORNEYS

INVENTORS
HAROLD R. DELL
MASAO HASHIGUCHI
EDWARDO D. LARA
BY
Townsend and Townsend
ATTORNEYS

*INVENTORS*
HAROLD R. DELL
MASAO HASHIGUCHI
EDWARDO D. LARA
BY
ATTORNEYS

INVENTORS
HAROLD R. DELL
MASAO HASHIGUCHI
EDWARDO D. LARA

BY

Townsend and Townsend
ATTORNEYS

INVENTORS
HAROLD R. DELL
MASAO HASHIGUCHI
EDWARDO D. LARA
BY
Townsend and Townsend
ATTORNEYS INVENTORS
HAROLD R. DELL
MASAO HASHIGUCHI
EDWARDO D. LARA
BY
Townsend and Townsend
ATTORNEYS

INVENTORS
HAROLD R. DELL
MASAO HASHIGUCHI
EDWARDO D. LARA

BY Townsend and Townsend
ATTORNEYS

INVENTORS
HAROLD R. DELL
MASAO HASHIGUCHI
EDWARDO D. LARA

BY

Townsend and Townsend
ATTORNEYS

INVENTORS
HAROLD R. DELL
MASAO HASHIGUCHI
EDWARDO D. LARA
BY
Townsend and Townsend
ATTORNEYS INVENTORS
HAROLD R. DELL
MASAO HASHIGUCHI
EDWARDO D. LARA
BY
Townsend and Townsend
ATTORNEYS

INVENTORS
HAROLD R. DELL
MASAO HASHIGUCHI
EDWARDO D. LARA

BY Townsend and Townsend
ATTORNEYS

PATENTED JAN 25 1972 3,638,185

SHEET 17 OF 20

INVENTOR.
HAROLD R. DELL
MASAO HASHIGUCHI
EDWARDO D. LARA
BY
Townsend and Townsend
ATTORNEYS

INVENTORS
HAROLD R. DELL
MASAO HASHIGUCHI
EDWARDO D. LARA

BY Townsend and Townsend
ATTORNEYS

INVENTORS
HAROLD R. DELL
MASAO HASHIGUCHI
EDWARDO D. LARA
BY
Townsend and Townsend
ATTORNEYS

HIGH-DENSITY PERMANENT DATA STORAGE AND RETRIEVAL SYSTEM

This invention relates to a new and improved permanent data mass storage and retrieval system for laser recording digital data at high-density on an energy-absorbing information storage medium and for transferring data between the information storage medium and a data channel of a computing system or temporary storage.

It is an object of the present invention to provide a new and improved high-density permanent data storage system and mass memory which reduces by several orders of magnitude the storage volume required by present data storage systems such as magnetic tape recording systems.

Another object of the invention is to provide a permanent information storage medium not subject to deterioration with time and from which data may be nondestructively reproduced indefinitely without degradation of the stored data. Thus, the present invention avoids the problems of demagnetization, deformation, printout and other forms of degradation to which magnetic tapes are subject.

A further object of the invention is to provide a computer controlled system and random access mass memory for high-speed and efficient permanent storage and nondestructive retrieval of digital data at extremely low error rates in the order of one unrecoverable bit in each $10^9$ bits. Modifications of the invention permit translation from binary to character oriented digital data and for sampling analog data for storage in digital form.

According to the present invention, a digital data processing system is provided for transferring digital data from the data channel of a computing system or from temporary storage to a high-density permanent data laser-recording medium and for nondestructively reproducing data stored in the high-density storage medium for transfer to the data channel of a computer system or to temporary storage. The digital data processing system includes a buffer storage for receiving input data for laser recording on the high-density storage medium and for receiving output data retrieved from the high-density storage medium. By means of a logic control subsystem, synchronous clock signals generated by a highly stable clock source and data verification signals generated by logic circuitry are interleaved with the input data for laser recording on the high-density permanent data storage medium. As the input data and interleaved synchronous clock and data verification signals are recorded, the logic control subsystem immediately compares the recorded data with the input data to detect the occurrence of recording errors and initiate remedial action upon the detection of a recording error. Such action consists in identification marking the erroneously recorded data and rerecording the data in correct form. During retrieval of stored data, the logic control subsystem removes or strips the interleaved synchronous clock and data verification signals from the output data and initiates appropriate remedial action in the event that a verification signal indicates the presence of an error. The output data is thereafter transferred to the buffer storage.

One aspect of the invention contemplates interleaving data verification signals of two types with the input data for recording on the storage medium. A first signal is associated with certain data segments of predetermined length to indicate the presence of a recording error in the corresponding data segment. The second signal consists of a check sum signal associated with each string of data segments of predetermined length indicating the sum of bits in the string. During data retrieval, remedial action initiated by the first type of data verification signal comprises eliminating each data segment in which a recording error is present whereby an accurately rerecorded data segment following the eliminated erroneous data segment can be transferred to the buffer storage. Also, during retrieval of data, a sum is generated for each string of data segments and compared with the second type of verification signal, the check sum signal, associated with the string. A variance initiates remedial action which consists of rereading the string of data segments till no variance occurs or flagging with a warning signal the string of data segments in which the check sum comparison indicates the possible presence of an error.

Another aspect of the invention contemplates connecting the buffer storage and logic control subsystem to a common bus for serial transfer of data. Sequencing logic control means regulates the sequence of data transfers during recording and reading of data, and the synchronous clock, which may be a crystal-controlled oscillator, provides timing control signals for the sequencing logic control means during recording operations.

One feature of the invention is found in the timing control signals for sequencing during readout or retrieval of stored data. Synchronous clock signals removed or stripped from the output data retrieved from the storage medium provide a byte or character oriented clock. The output from a voltage-controlled oscillator is synchronized to this character-oriented clock by means of error voltage feedback to provide the timing control signals during readout of stored data.

According to another feature of the invention, the logic control subsystem is provided with self-checking diagnostic circuits for detecting and localizing malfunctions in the logic control subsystem and sequencing logic means.

The data processing system includes a laser recording unit of the type wherein a modulated laser beam generated by a laser, optical modulator, and modulating signal, selectively ablates in the form of data tracks, an energy-absorbing information storage medium during recording. Digital information is stored in the form of diffraction limited digital bits ablated from the energy-absorbing storage medium by the focused coherent light. Instantaneous readout at the point of recording, or subsequent readout is accomplished by sensing variable intensity light received from the medium. In addition to the elements enumerated above the recording unit includes an optical record/read head for focusing light onto and receiving light reflected from the data storage medium, and precision translating means for providing relative motion between the record/read head and the storage medium. A division of amplitude beam splitter is interposed in the path of light received from the data storage medium and transmitted through the record/read head, deflecting light to the light data sensing elements.

A feature of the laser recording unit is that during the record mode, instantaneous reflective readout provides at the data-sensing elements a storage medium verification signal for detecting defects in the storage medium surface at the point of recording and prior to ablation of the medium. The surface continuity of the medium is thereby monitored to insure that the medium is free from defects. The logic control subsystem processes the medium verification signal and initiates identification marking on the storage medium by the laser recording unit of storage medium defects.

Another feature of the laser recording unit is in the servo tracking of linear data tracks during readout of stored information. According to this aspect of the invention, a division of wave front beam splitter is interposed in the path of light received from the information storage medium and deflected by the division of amplitude beam splitter in the direction of the light data sensing elements. The division of wave front beam splitter provides a pair of beams from which a pair of signals is generated by the data-sensing elements. Logic circuitry generates sum and difference signals from the split beam signals. A moving optical element interposed in the path of light projected on the storage medium for positioning the light beam is controlled by the difference signal for positioning and centering the light beam over a linear data track on the storage medium during relative motion between the data storage medium and the optical record/read head. At the same time the sum signal provides a medium verification signal during recording and data output signals during reading. In one arrangement of the laser recording unit the movable optical element for positioning and controlling the light beam projected on the data storage medium comprises a servo-controlled galvanometer mirror. The record/read head and the movable optical element are mounted on a translatable carriage for scanning the information storage medium in predetermined track configurations.

As previously discussed, the instantaneous reflective readout during recording not only provides a medium verification signal prior to recording, but also a recording verification signal after ablation of the medium for simultaneously comparing recorded data with the input data. In the event that a recording error is sensed by the data-sensing element from the reflected light beam, remedial action is initiated as heretofore described.

The laser recording unit also includes laser intensity control means comprising a feedback loop from the data-sensing elements to the optical modulator to provide servocontrol of the laser intensity to preselective levels during recording and readout. In particular, during the read mode, the intensity control adjusts the laser beam intensity level sufficiently low so that ablation of the information storage medium cannot occur. A noncoherent light source and corresponding optical train can be provided during the read mode for directing noncoherent light through the optical record/read head for reflective readout of data stored in the information storage medium.

The type of laser recording unit primarily described herein for use with the present invention includes a drum having a cylindrical periphery and a precision motor for rotating the drum. A plurality of removable and replaceable drum interfaces each in the form of a strip of an energy-absorbing data storage medium suitable for mounting around the cylindrical periphery of the drum are stored at particular addresses in an index file in flat configuration. A strip selector and loader selects a specified strip from an address in the index file and positions the strip for loading onto the drum. The strip selector and loader also returns strips to the index file. The drum includes means for loading and retaining a selected strip around the cylindrical periphery of the drum. The optical record/read head which directs light onto the information storage medium and which receives light from the medium is mounted on a movable carriage. A carriage-positioning servo translates the carriage and record/read head across the cylindrical periphery of the drum in a direction transverse to the direction of rotation of the drum. Also mounted on the carriage in the path of light transmitted through the read/record head is an optical tracking servo for directing light onto the strip in predetermined track configurations during translation of the carriage and rotation of the drum. In one arrangement, the optical tracking servo includes an optical element such as a galvanometer mirror in the optical path of light directed through the record/read head for deflecting the light beam.

During recording by ablation of the information storage medium by the modulated laser beam, the carriage position servo is adapted to translate the carriage and record/read head at a uniform velocity across the cylindrical periphery of the rotating drum. The optical tracking servo, comprising deflectable optical element such as a mirror galvanometer, deflects the light beam passing through the optical record/read head in a sawtooth waveform motion. Logical circuitry synchronizes the slope and frequency of the sawtooth waveform of the galvanometer mirror, the speed of rotation of the drum, and translation of the carriage so that light directed through the record/read head scans the storage medium strip mounted on the drum in separate parallel substantially circular lines. After the data has been recorded, the data storage strip is removed from the drum and returned to its appropriate address in the file. Data tracks ablated in the data storage strips are thus arranged in longitudinal straight parallel lines.

Other laser recording apparatus configurations such as that described in U.S. Pat. No. 3,314,075, or such as a disk recording medium configuration can be used with the data formatting of the present invention.

During readout of stored data, the desired track is acquired by translation of the optical record/read head carriage and deflection of the mirror galvanometer. An appropriate address is encoded near the beginning of each track and track positioning on the desired track is indicated at the data-sensing elements. After the carriage has been positioned by the carriage positioning servo in the vicinity of the address of the desired data track, the galvanometer mirror or other deflectable optical element sweeps the light beam across the data track in the field of the optical record/read head until the desired address is found. Once the desired track is acquired, the tracking servo and mirror galvanometer maintain the light beam centered on the appropriate track. When crossing the abutting ends of the elongate data storage strip scanning alignment of respective data track ends is accomplished by automatic calibration of the sawtooth motion of the galvanometer mirror so that upon completion of each rotation of the drum, the correct data track is acquired on the next revolution.

When the data storage strip is wrapped around the cylindrical periphery of the drum with respective ends of the strip substantially abutting for retrieval of data stored in the strip, the respective ends of each data track may not be precisely aligned. In order to compensate for nonalignment of the respective ends of the data tracks during reading of stored data, logic circuitry is provided to control and adjust the slope of the sawtooth waveform motion imparted by the galvanometer mirror according to encoded address data read out from the parallel tracks of stored data so that upon crossing the abutting ends of the strip the scanning light beams acquires the appropriate track.

According to another embodiment, in order to avoid compensation for nonalignment, the strip of an energy-absorbing data storage medium is formed in a closed loop adapted to be loaded over the drum, while the drum is formed to be extendable and retractable in its radial dimension for loading and retaining the looped strip thereon.

In the form of the laser recording unit where the energy-absorbing storage medium is formed in flat elongate strips, the strips are loaded and retained around the periphery of the drum by two sets of pawls. Camming means are provided for actuating the first set of pawls to protrude through the peripheral surface of the drum and engage a pair of holes at the first end of the strip. Upon rotation of the drum, the strip is drawn around the periphery of the drum and the camming means actuates the second set of pawls to engage holes at the second end of the strip. The strip is retained by a vacuum holddown at a precise position in a groove formed around the periphery of the drum and having one inclined edge.

A further feature of this laser recording unit is that the drum's rotation speed is controlled by synchronizing the speed with a master frequency reference signal. An optical tachometer is coaxially rigidly mounted to the axis of the drum for generating a signal corresponding to the rotation speed of the drum. A servocontrol compares the tachometer signal with the master reference clocking signal and synchronizes the drum rotation speed to the reference signal.

The entire high-density permanent data storage and retrieval system including the laser recording unit and associated logic control systems and logic circuitry is housed in a self-contained console. The laser recording unit is maintained in an airtight enclosure with filtration of air circulating through the enclosure. Dust protection is obtained by maintaining the airtight enclosure under high air pressure so that air continuously escapes at leakage points without admission of dust particles which may affect the information storage medium strip. Replacement of lost air is accomplished by an air pump filtration system. The data storage strips are stored in a flat configuration within airtight scabbards at appropriate addresses in the index file contained within the console. The data strips are appropriately selected and positioned for loading by the strip selection and loading mechanism and the data strip is removed through a loading port for loading onto the drum. Additional air drawn into the airtight enclosure is filtered to replace air lost during a loading cycle or at other leakage points. The laser recording unit and associated mechanisms are all mounted on a heavy precision mounting plate isolated form the rest of the console by vibration mounts. The bulk of the console houses the electronics and associated circuitry.

FIGS. 9 and 9A are a front view and side view, respectively, of a record strip for permanently recording data while

FIGS. 11A–G and 12A–E are diagrammatic views of the strip selector apparatus and drum loading and unloading operations respectively.

Figure 13:
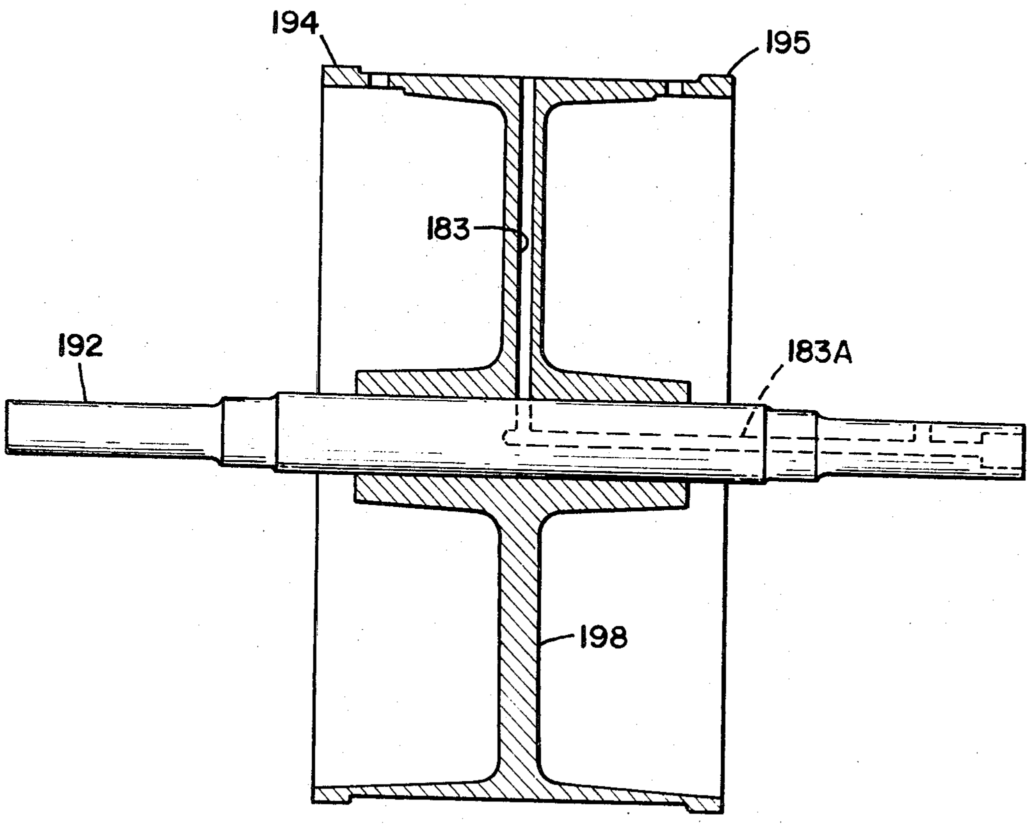
Figure 13A:
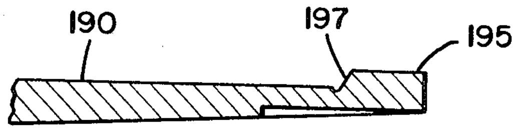

FIG. 13 is a cross-sectional view of the record drum, while FIG. 13A is a detailed fragmentary view of the periphery of the drum in cross section.

Figure 14:
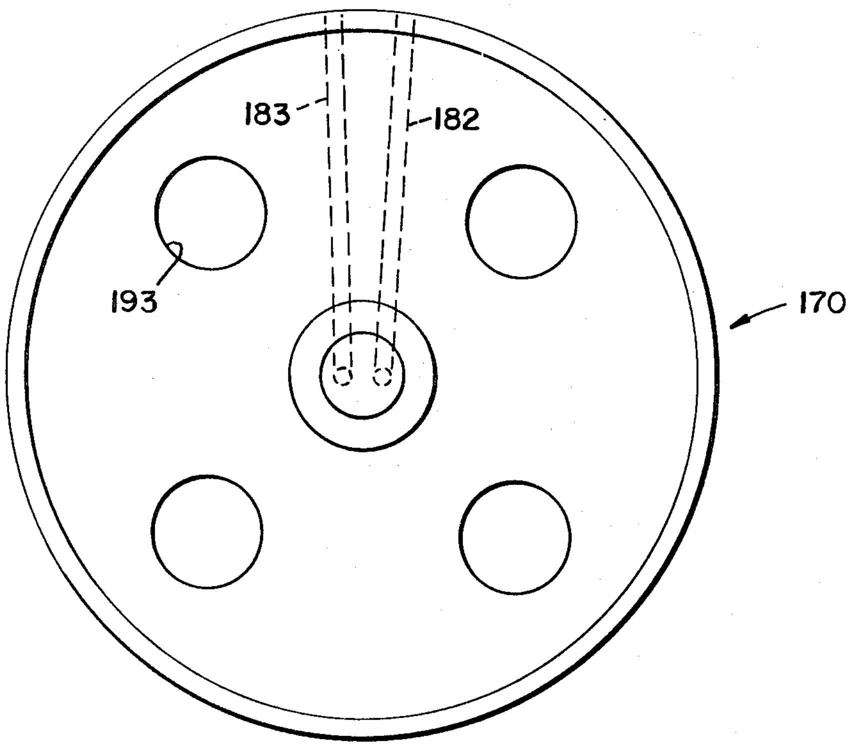

FIG. 14 is a side view of the record drum.

Figure 15:
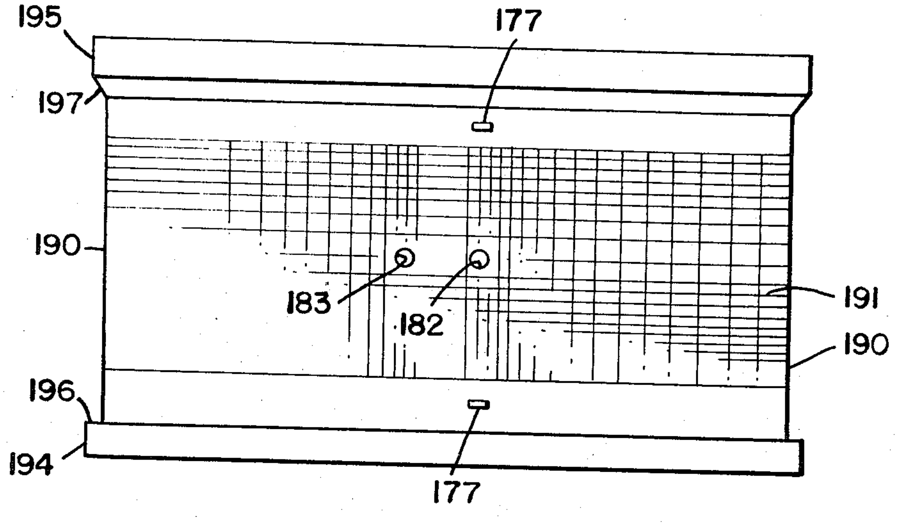

FIG. 15 is a plan view of the cylindrical periphery of the record drum.

Figure 16:
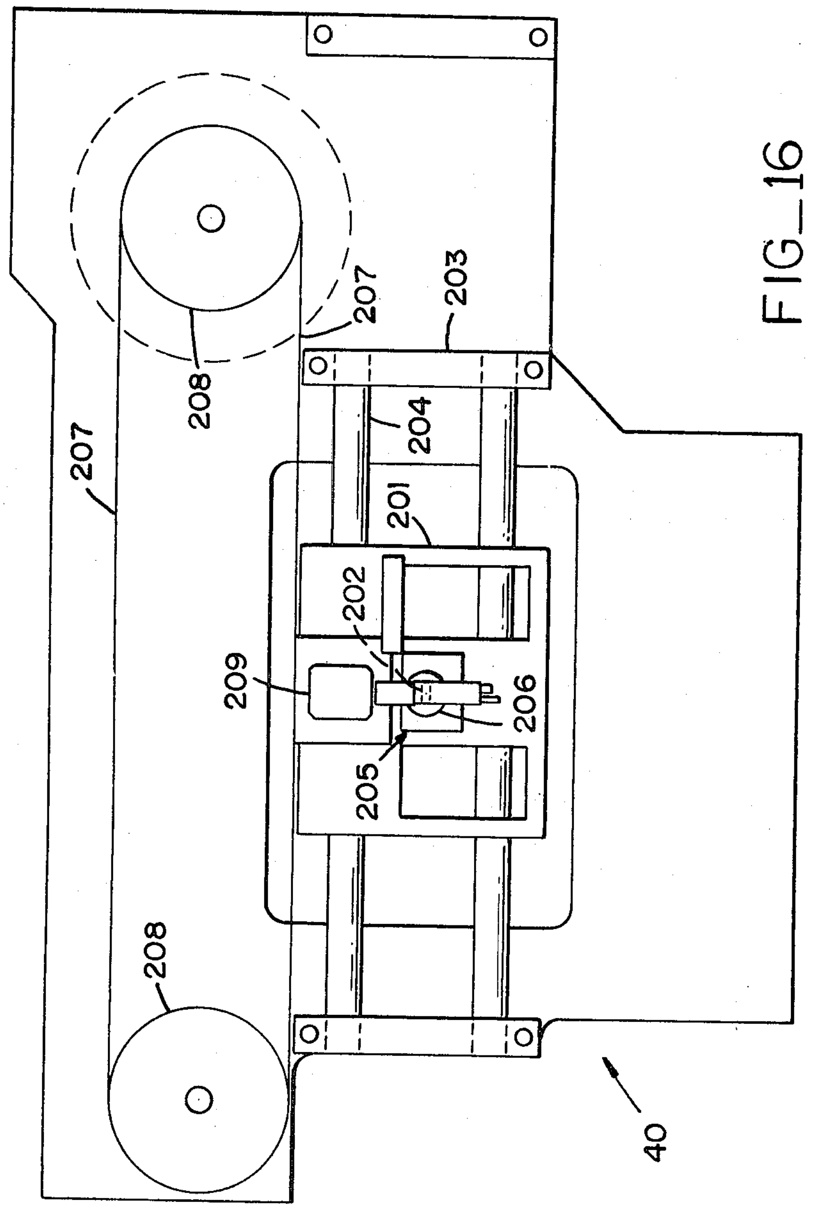

FIG. 16 is a plan view of the linear carriage mounted for translation across the peripheral face of the drum.

Figure 16B:
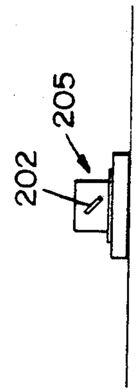
Figure 16A:
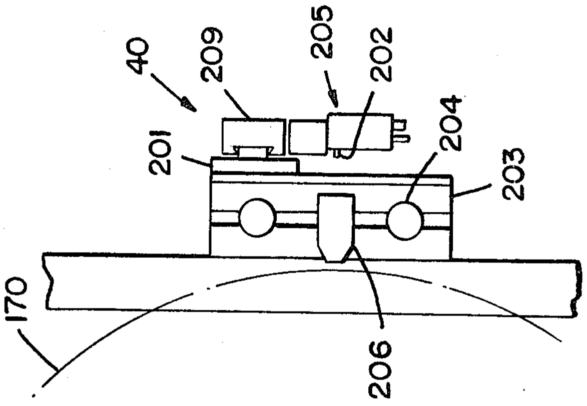

FIG. 16A is a side view of the linear carriage, while FIG. 16B is a detailed side view of the galvanometer mirror.

Figure 17:
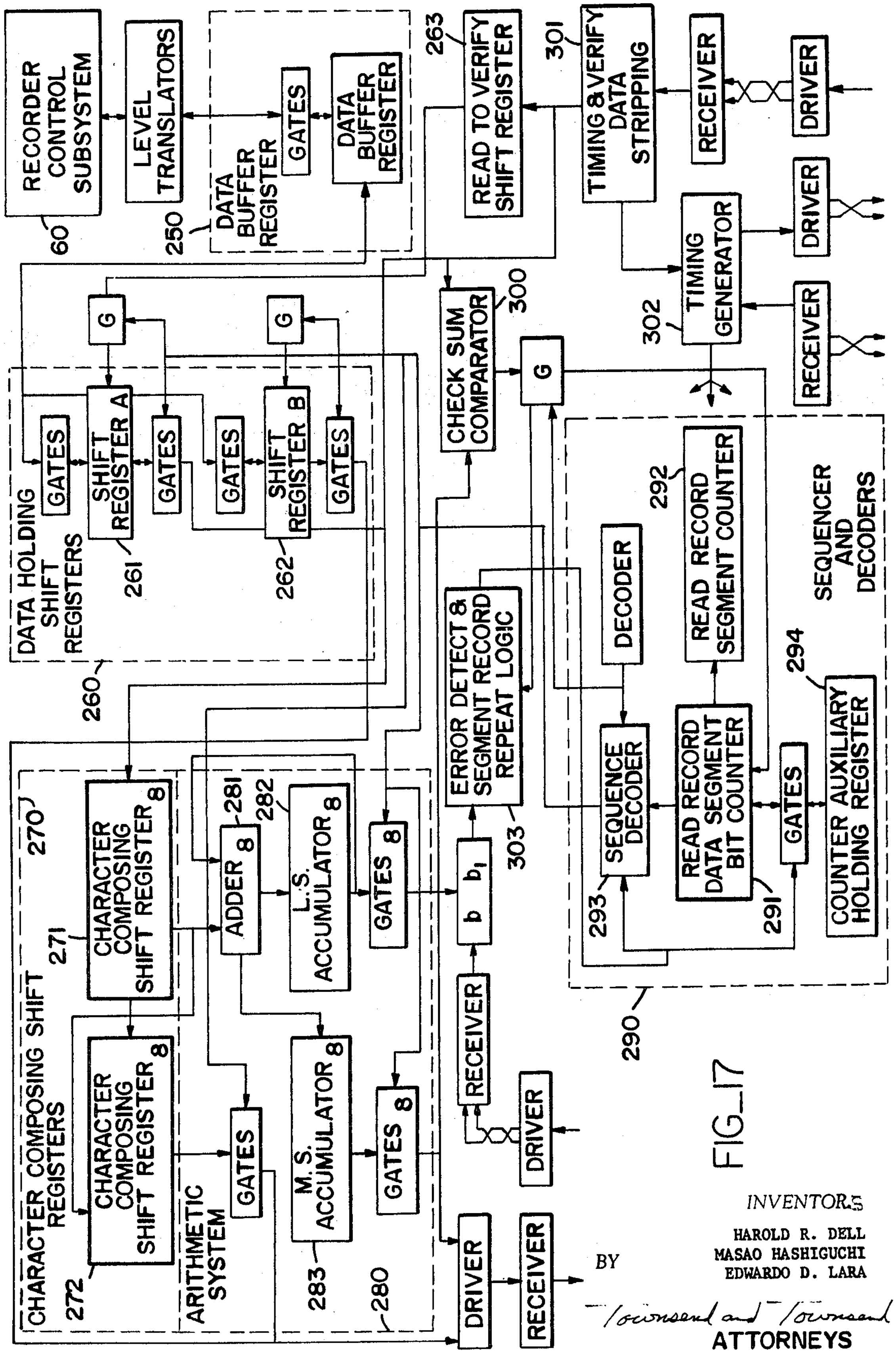

FIG. 17 is a block diagram of the format control subsystem.

Figure 18:
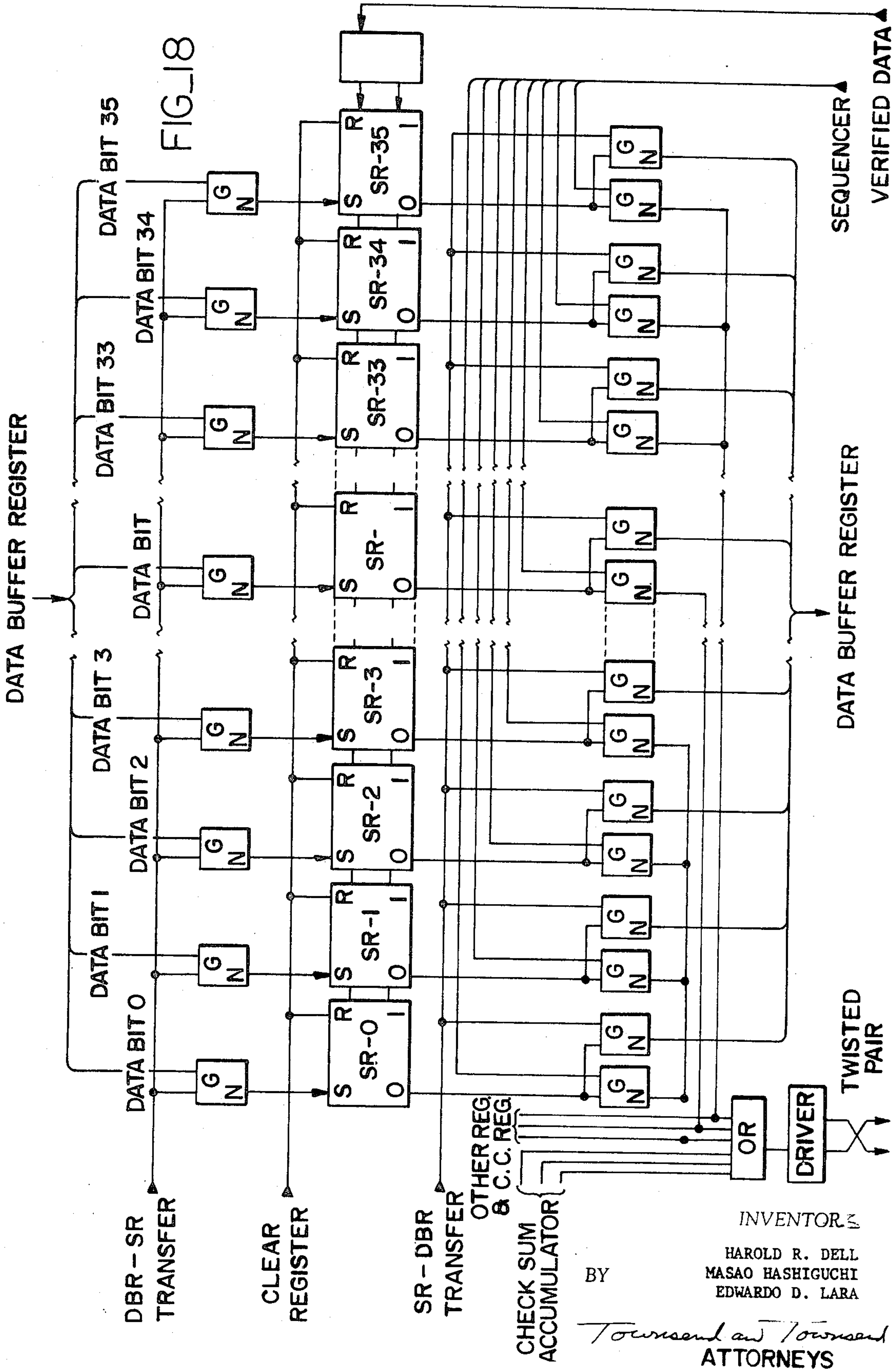

FIG. 18 is a block diagram of a gating circuit for performing parallel to serial conversion in a format control subsystem.

Figure 19A:
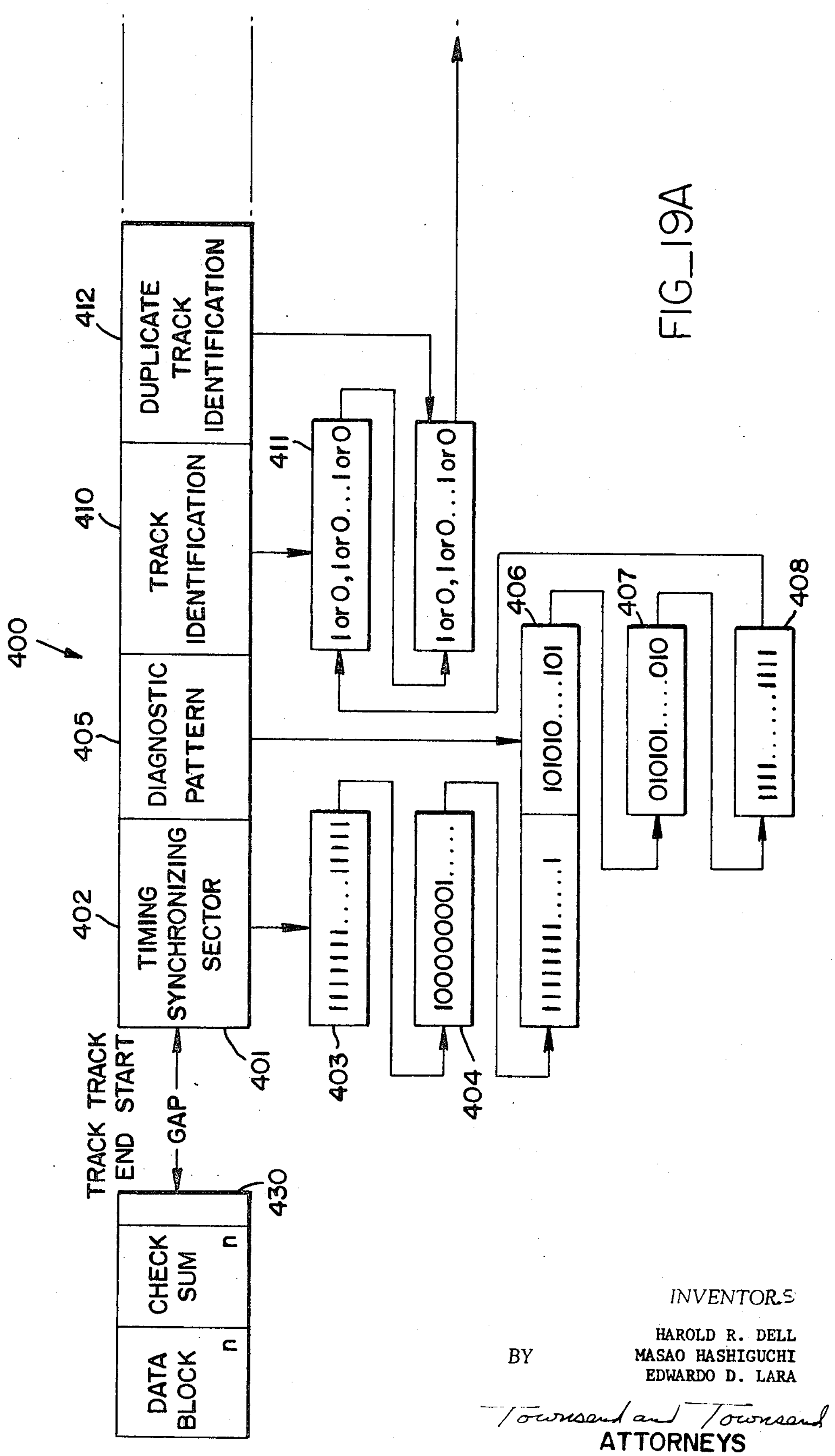
Figures 19, 19B:
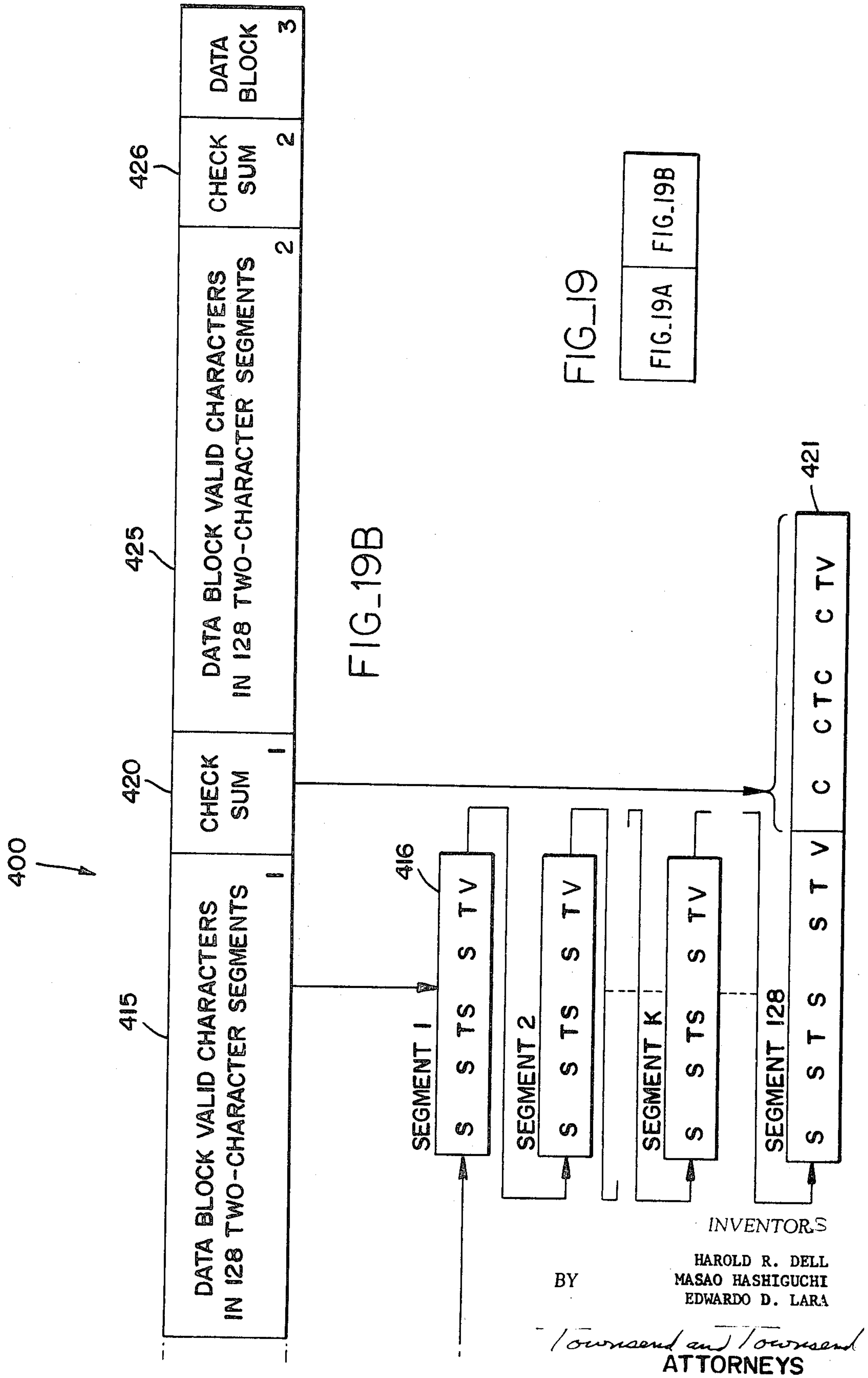

FIG. 19 comprised of FIG. 19A and FIG. 19B is a block diagram of the recording format of a single data track on the record strip.

Figure 20:
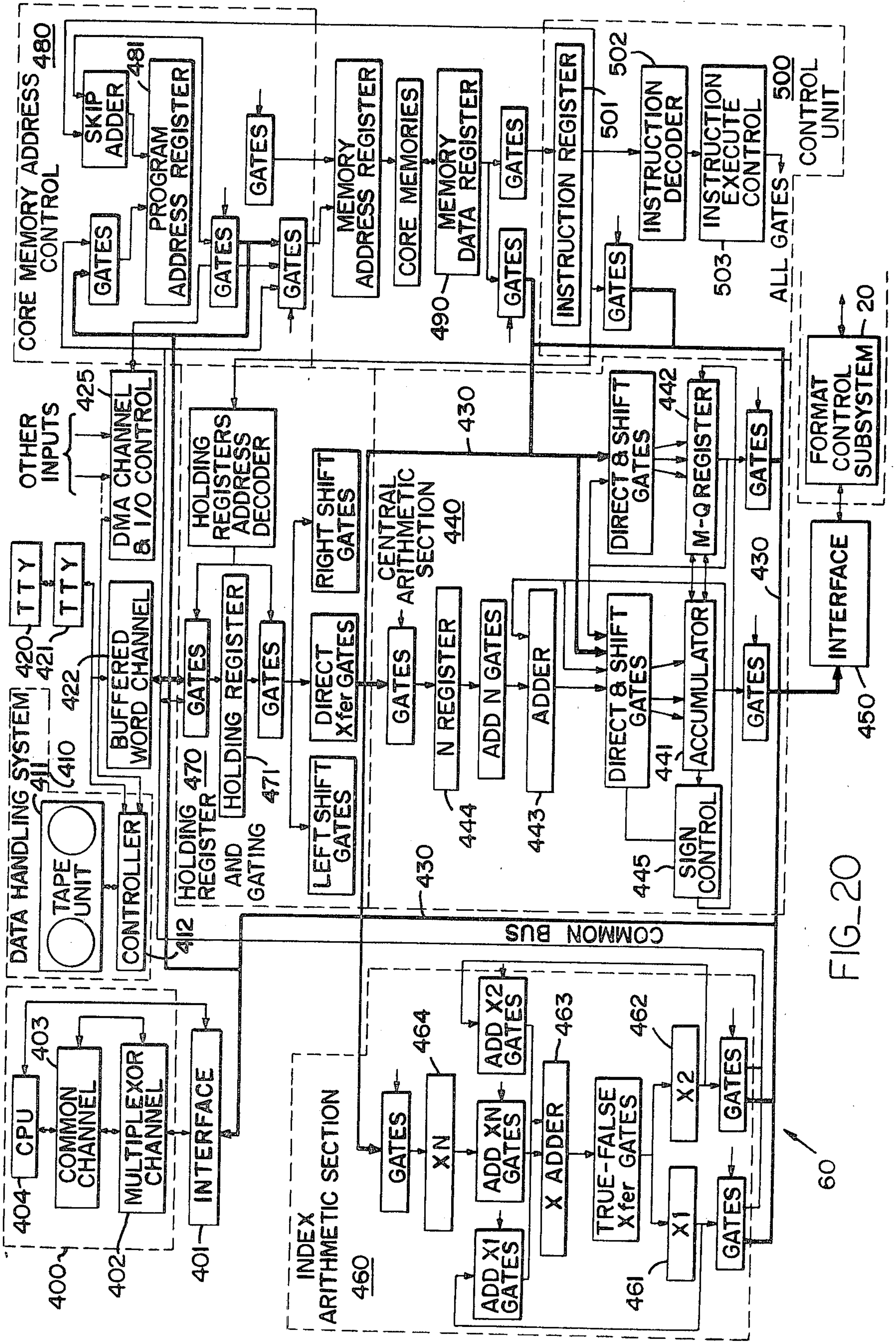

FIG. 20 is a block diagram of the recorder control subsystem.

Figure 21:
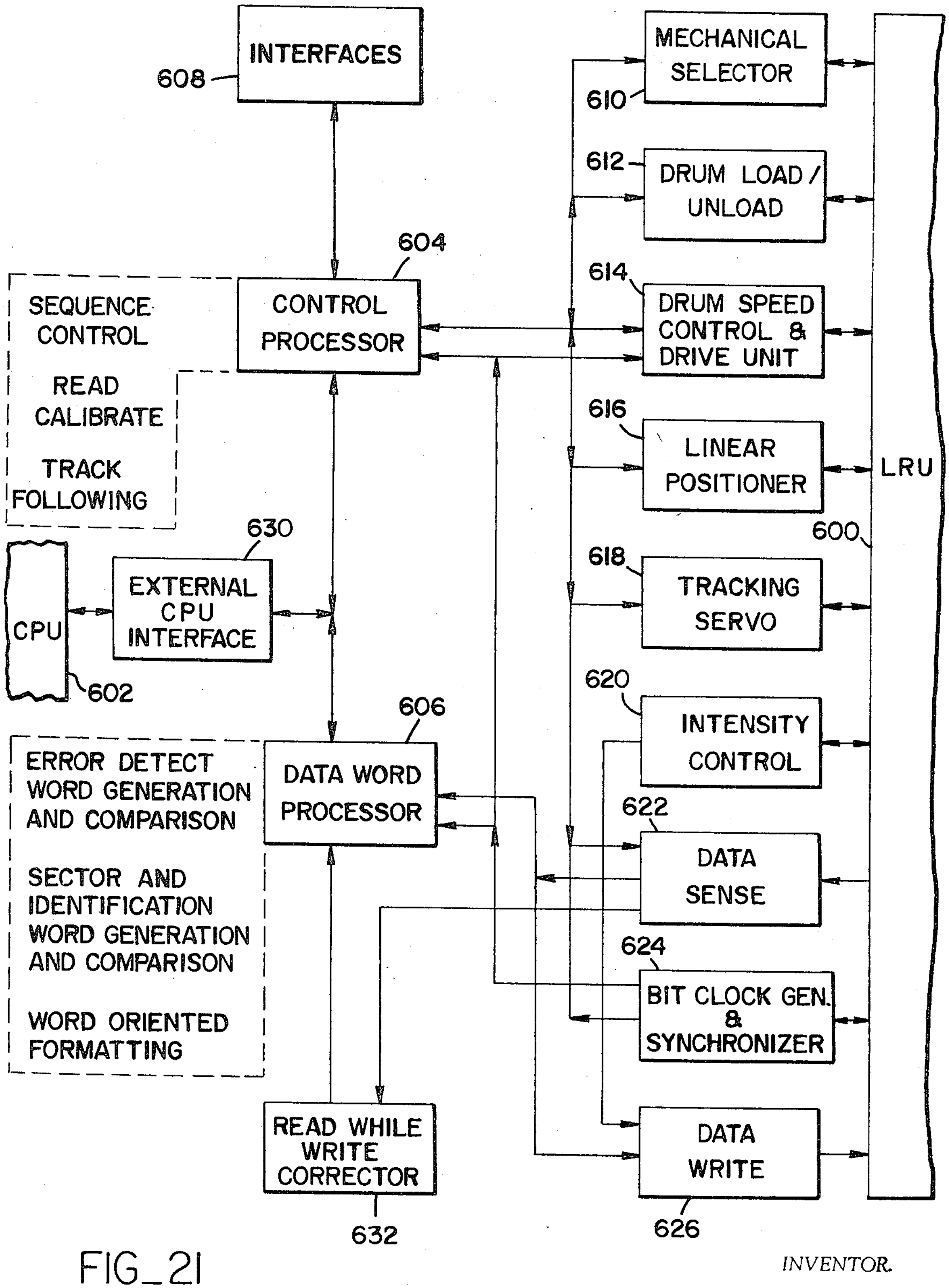

FIG. 21 is a general block diagram of the high-density permanent data storage and retrieval system.

Figure 22:
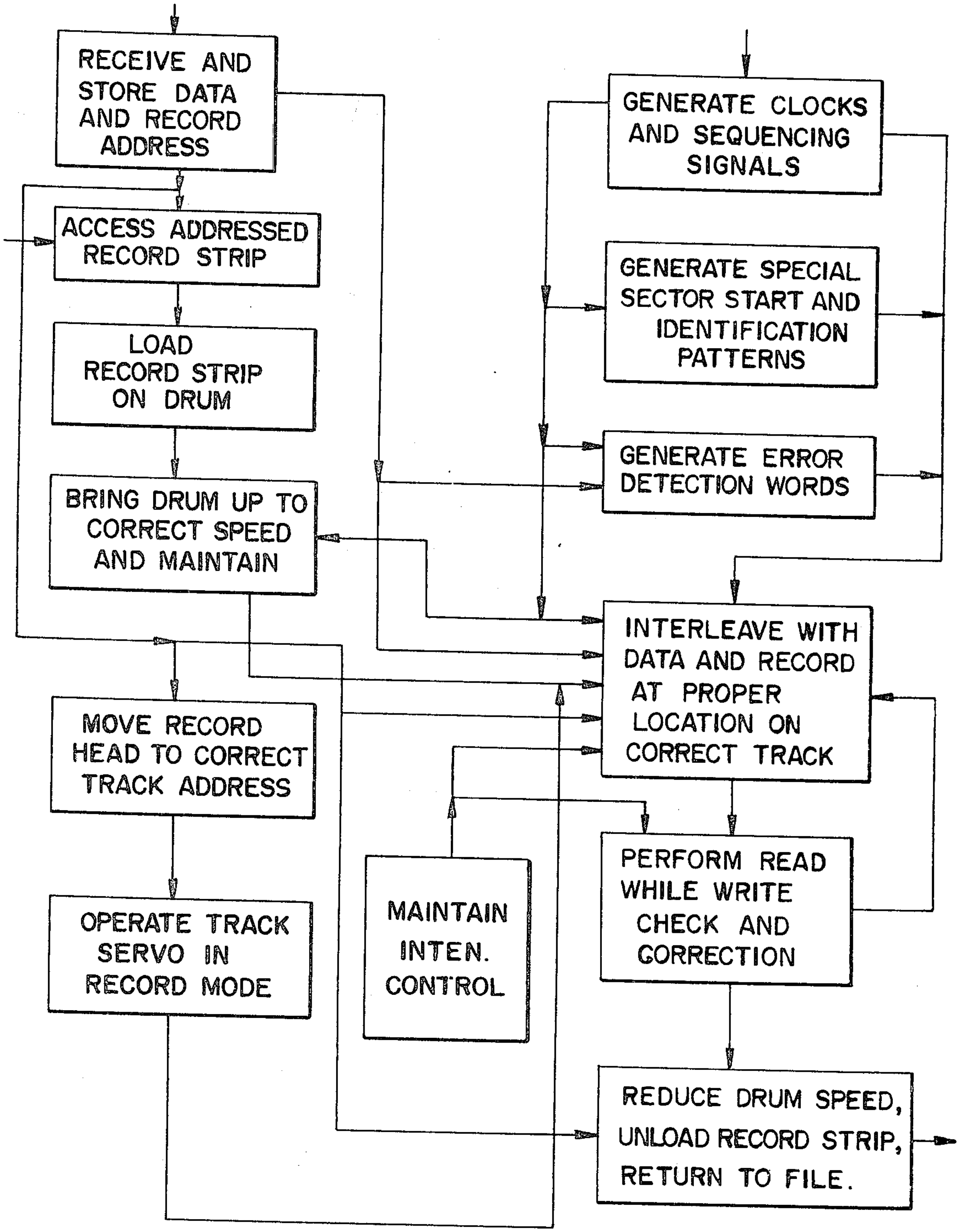

FIG. 22 is a general flow diagram of the laser recording unit recording process.

Figure 23:
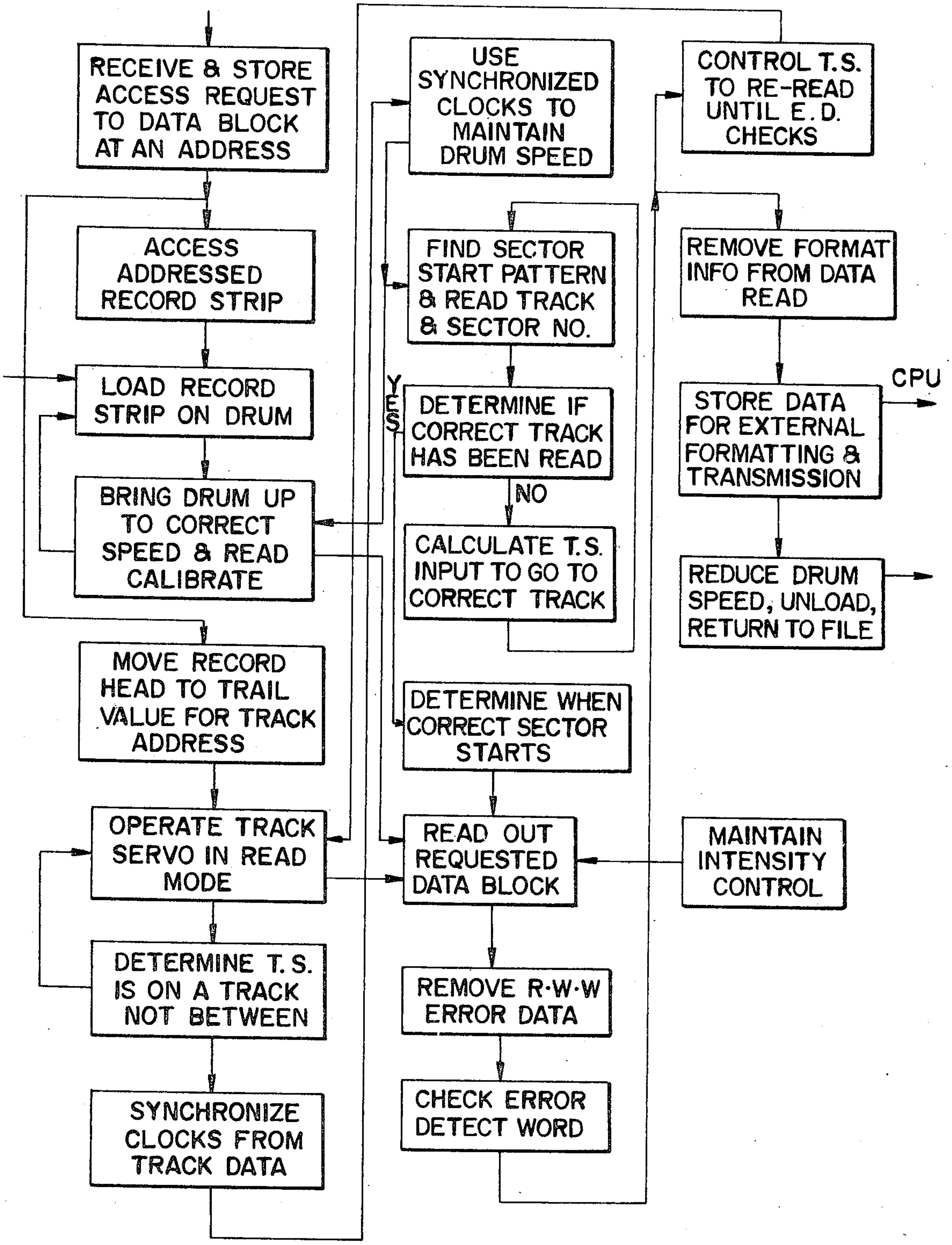

FIG. 23 is a general flow diagram of the laser recording unit reading or retrieving process.

The high-density permanent storage and retrieval system contemplated by the present invention can be used as a peripheral device with respect to large computing or data processing systems. To this end, the system includes a laser recording unit and associated record/reproduce electronics, and a logic or format control subsystem and recorder control subsystem for controlling the recording and reproducing processes of the laser recording unit. There is also provided an interface between the recorder control subsystem and the data channel of a computer complex with which the system of the present invention is to be used as a peripheral device. The external interface at the recorder control subsystem is suitably designed for compatibility with the data channel or other input/output section of the particular computer complex with which it is to be used.

LASER RECORDING UNIT

Figure 1:
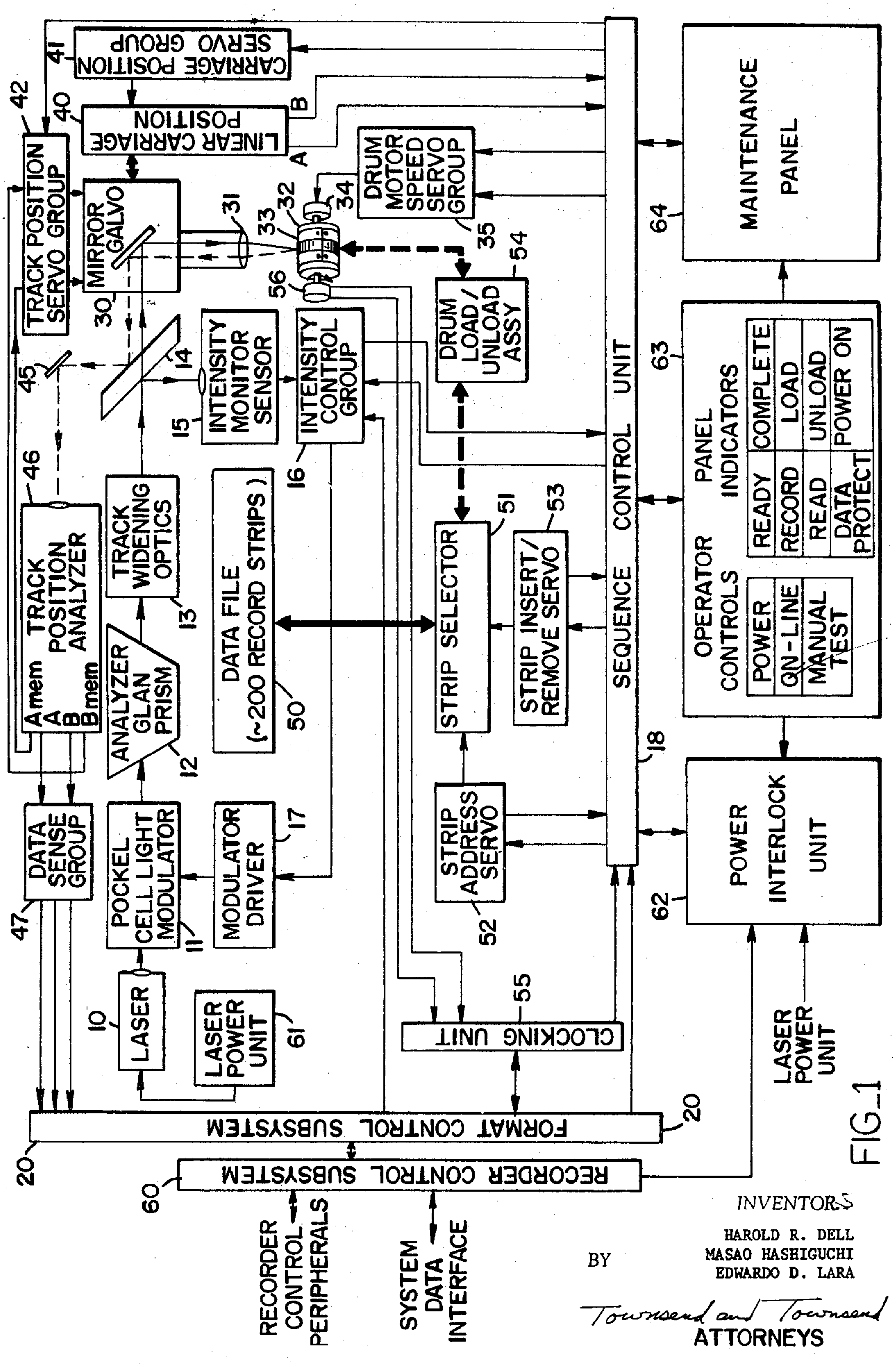
FIG. 1 is a block diagram of the laser recording unit incorporated in the high-density permanent data storage and retrieval system of the present invention.

FIG. 1 is a general block diagram of the high-density permanent data storage and retrieval system and in particular the laser recording unit which can record and retrieve data at a microscopic level. Referring generally to the block diagram, the laser recording unit includes a coherent light source 10 such as an argon II ionic laser operating for example at 4,880 A. units in continuous wave $TEM_{00}$ mode. The output light beam from laser 10 is modulated by Pockel cell modulator 11 in accordance with input data to be recorded on the information storage medium. The modulated light beam passes through a Glan prism analyzer 12 and track-widening optics 13 which change the cross-sectional configuration of the light beam from circular to rectangular. Each of the optical elements is mounted on adjustable supports. Emerging from the track-widening optics, the light ray is intercepted by a division of amplitude beam splitter 14. A portion of the ray is reflected from the front surface of beam splitter 14 to an intensity monitor sensor 15 which generates a signal received by the intensity control group 16. The intensity control group 16 receives input signals from the format control subsystem 20 and regulates the Pockel cell modulator 11 by means of a modulator driver 17 to provide appropriate light intensity for recording data. In addition, the sequence control unit 18 and format control system 20 monitor the intensity of the laser beam via the intensity control group 16 and direct the appropriate intensity according to the selected mode, i.e., record or read.

The portion of the laser beam transmitted through the beam splitter 14, the beam being refracted and slightly displaced, is directed through further optics to intersect the optical center of an angled galvanometer mirror 30. The galvanometer mirror 30 directs the light ray through a microscope lens objective 31 which forms a record/read head, to be focused on the rotating surface of drum 32. Mounted around the periphery of drum 32 is a flat elongated strip 33 of energy-absorbing material which is selectively ablated in bits of diffraction limited size in a pattern determined by the modulation of the light beam. The longitudinal side of the focused rectangular light beam is oriented parallel to the axis of rotation of drum 33. The drum is rotated by a precision printed circuit armature motor 34 whose speed is controlled by a drum motor speed servo group 35.

The mirror galvanometer 30 and record/read head 31 are positioned on a linear carriage positioner 40 which translates the focused light beam across the periphery of the drum to any desired position. Positioning of the carriage 40 is accurately controlled by carriage position servo group 41. A carriage position encoder is also provided on the carriage for providing carriage position data to the sequence control group 18. The rectangular image formed by the focused beam of light can further be positioned across the drum width by deflection of the mirror galvanometer across the field of view provided by the microscope objective lens 31. Deflection of mirror galvanometer 30 is accomplished by a track position servo group 42 as hereinafter described.

During recording of input data, the laser beam intensity is maintained at a level sufficient to burn or ablate the information storage medium. At the same time a portion of the beam is reflected back from the information storage medium to provide monitoring output signals. During the read mode, the laser beam intensity is maintained at a low level to prevent ablation or burning of the information storage medium, the incident light beam reflected in an intensity pattern corresponding to the stored data.

Reflected light is transmitted back through the microscope objective 31 and is deflected by the mirror galvanometer through additional optics to the division of amplitude beam splitter 14. A portion of the returning ray is reflected through additional optics 45 to a track position analyzer 46 comprising a division of wave front beam splitter for providing a bifurcated beam of light and a pair of signals corresponding to the bifurcated beam. The pair of signals corresponding to the output data are summed in a data sense group 47 to provide output data signals to the format control subsystem 20. The same pair of signals after passing through delay elements in the track position analyzer are also fed to the track position servo group 42 which utilizes the difference between the two signals for servocontrol of positioning of the mirror galvanometer for accurately tracking a data track on the data storage strip 33 mounted on drum 32.

A plurality of flat elongate storage strips in the order of, for example, 200, suitable for mounting on the drum 32 is stored in flat configuration in a data file 50. Data files can be interchangeably placed in the unit. Upon receiving an instruction to insert or remove a particular data strip, the strip selector data elevator 51 in conjunction with strip address servo 52 and strip insert/remove servo 53 selects the appropriate data strip for delivery to the drum load/unload assembly for return to the appropriate address in the data file. The drum load/unload assembly 54 positions and loads the selected strip on drum 32 or receives a strip already mounted on drum 32 for return to the data file.

The complex sequence of operations executed by the various elements of the high-density permanent storage data and retrieval system are mediated by a sequence control unit 18 in conjunction with the format control subsystem 20. Thus, command signals to the strip address servo 52, strip insert/remove servo 53, drum load/unload assembly 54, and drum motor speed servo group 35, for regulating the selection and loading or unloading and returning of data record strips, originate from the recorder control subsystem 60 and formate control subsystem 20 via the sequence control unit which in addition monitors the status of each of these elements during the operation. Thus, during loading and unloading, for example, the drum speed must be reduced in order to mount the record strip, the drum speed thereafter being increased to the level required for reading or recording. For demounting the drum speed must again be reduced.

During recording of data on a mounted record strip, commands to the intensity control group 16, track position servo group 42, and carriage position servo group 41, also originate from the recorder control subsystem 60 and format control subsystem 20 via the sequence control group. These commands adjust the intensity of the laser beam for recording and position the laser beam on the data record strip according to a desired scanning raster as hereinafter described. At the same time, the sequence control unit 18 monitors the intensity of the laser beam and the position of the carriage 40 on which the mirror galvanometer 30 and record/read head 31 are mounted. Thus, a carriage position linear encoder is provided in conjunction with the carriage 40 to provide output signals to the sequence control unit. During the read mode, the track position servo group is controlled by signals from the track position analyzer 46 in order to provide accurate tracking of prerecorded data tracks on the record strip 33. Clocking signals for the sequence control unit are provided by a synchronous clocking unit 55 which provides clock and control signals to the sequence control unit 18. At the same time read and record mode commands are received by the sequence control unit from the format control subsystem. The clocking unit 55 also provides clock and control signals for the format control subsystem 20. A rotary position encoder 56 which may be an optical tachometer, mounted coaxially for rotation with drum 32 provides reference clocking signals to the clocking unit 65. Furthermore, synchronous clocking signals interleaved with data stored in the data record strips 33 and retrieved during readout of stored data by data-sensing group 47 are stripped from the output data by the format control subsystem 20 to provide a character-oriented clock which provides further reference clocking signals to clocking unit 55 as hereinafter described.

The recorder control subsystem 60 provides an interface between the format control subsystem and the data channel of a computer data processing system and to other peripheral controls. The format control subsystem 20 itself forms an interface between the recorder control subsystem 60 and the laser recording unit.

With the exception of the separate laser power unit 61 all supplied AC power passes through power contactors in the power interlock unit 62 to provide a controlled power turnon and turnoff sequence. The power contactors are interlocked so that power failure in any low-voltage unit will initiate the turnoff of all power supplies in a controlled manner. Each of the low-voltage power supplies is protected from application of reverse voltage by means of power rectifiers.

The operator control panel 63 includes operator control pushbuttons POWER, ON-LINE MANUAL TEST. The POWER pushbutton turns the power on and off while the ON-LINE pushbutton places the system in ready status for operation entirely under program control from a programmed processor of the recorder control subsystem as hereinafter described. The MANUAL TEST pushbutton removes the unit from ON-LINE or ready status and permits use of maintenance panel controls to manually address a strip in the record strip file, and to sequence the elements through the various steps of the load/unload and record/read processes. Upon depression of the ON-LINE button, the system verifies that a record strip file 50 is properly positioned for mechanical selection of a desired record strip and that the turnon sequence has been properly performed. The READY indicator on the indicator panel will not come until all of these requirements have been met. The control pushbuttons generate control signals received by the sequence control unit for appropriate sequencing of the commanded operations. At the same time, signals received at the operator control panel from the sequence control unit activate a variety of indicators for indicating the monitored status of the various elements of the unit. Thus, the READY indicates that the system is under computer control and all interlocks are closed. The system is therefore ready for loading. The RECORD ON indicator indicates that data is being recorded while the READ ON indicator indicates that data is being read from a record strip. The OPERATION COMPLETE indicator is activated when a record/read operation is complete. The DATA PROTECT indicator is activated when the system cannot be placed in the record mode. This indicator is on when a previously recorded record strip is inserted in order to protect the prerecorded strip from ablation. The indicator is turned off when an unrecorded record strip is loaded. The LOAD indicator indicates that a record strip is being accessed by the mechanical selector. The UNLOAD indicator is activated when a record strip is being returned to the file by the mechanical selector.

The maintenance panel 64 provided with the system is not visible to the operator and is provided for use by the maintenance personnel for periodic monitoring and calibration of the elements of the unit.

Figure 2:
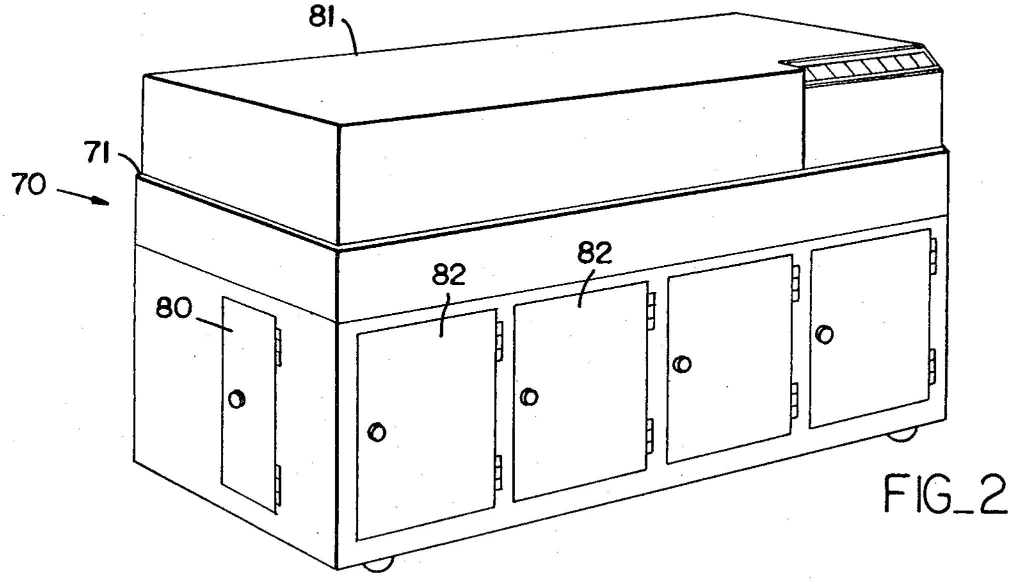
FIG. 2 is a perspective view of the console for housing the laser recording unit and associated electronics.
Figure 3:
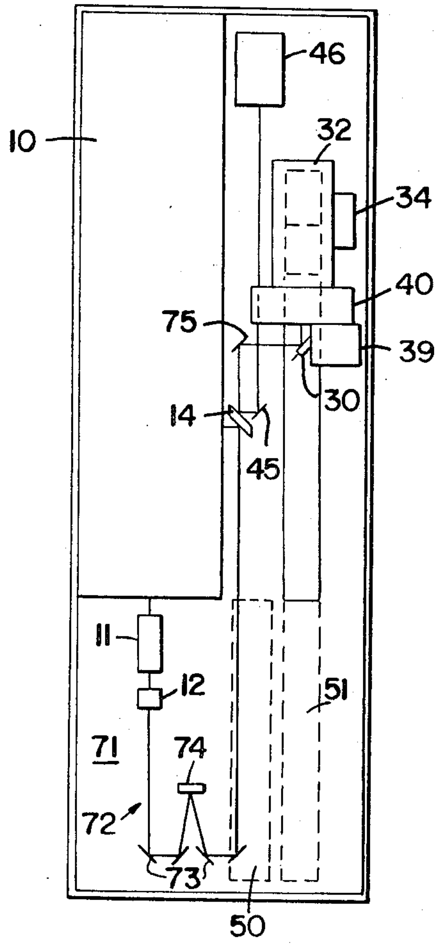
FIG. 3 is a diagrammatic plan view of the console with the cover removed.
Figure 4:
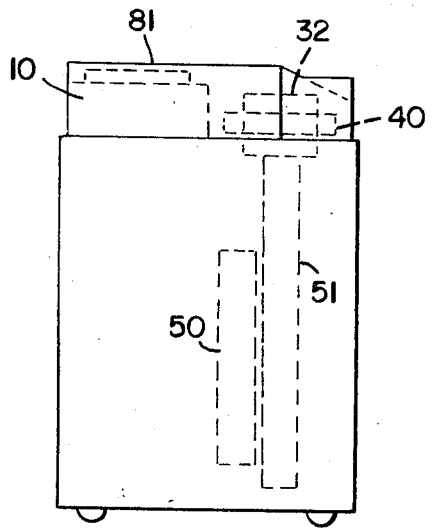
FIG. 4 is a diagrammatic side view of the console with the position of selected components shown in dotted lines.

The high-density permanent data storage and retrieval system contemplated by the present invention is housed in a console 70 illustrated in FIGS. 2 through 4. The laser recording unit including the laser, optics, drum and associated loading mechanism are mounted on a heavy precision mounting plate 71 near the top of the console and isolated from the rest of the console by vibration mounts. The plate is formed, for example, from a heavy welded channel understructure with a precision-ground aluminum toolplate mounting surface. A configuration for the laser and associated optics of the laser recording unit is shown in the plan view of the mounting plate and console illustrated in FIG. 3. The laser beam generated by laser 10 passes through the Pockel cell light modulator 11 and Glan analyzer prism 12 to the track-widening optics 72 consisting of a plurality of deflecting mirrors 73 and a cylindrical mirror 74. The cylindrical mirror 74 diverts the light ray through approximately a 90° angle, and is oriented with its longitudinal axis perpendicular to the plane containing the beams incident on and reflected from the mirror in order to change the form of the beam cross section from circular to rectangular. Upon leaving the last of the deflecting mirrors 73 of the track-widening optics 72 a portion of the ray is transmitted through the division of amplitude beam splitter 14, and is diverted by further optics 74 to the galvanometer mirror 30 which directs the light onto a record strip mounted on drum 32 driven by an integrated printed circuit motor 34. The optics are arranged to orient the laser beam so that the longitudinal axis of its cross-sectional rectangle is parallel to the axis of rotation of the drum. The transverse dimension of an ablated bit is determined by the timing of square-wave intensity modulation of the laser beam. Thus, the dimension of a rectangular bit in the direction of translation is adjusted by the square-wave intensity modulation so that the recording medium is ablated in substantially square bits. The linear translating carriage 40 upon which the record/read head and galvanometer mirror are mounted and the motor 39 for translating the carriage are mounted adjacent drum 32. Light rays reflected back from the record strip mounted on drum 32 return to the division of amplitude beam splitter 14 where a portion of the reflected ray is diverted to the mirror 45 which directs the output light ray to the track position analyzer 46.

Suspended beneath the mounting plate 71 are the mechanical record strip selector mechanisms including a precision slide or track for receiving a removable and replaceable 200 record strip file unit 50 inserted into the track through a door 80 provided at the end of the console 70. The strip selector elevator 51 is also suspended from the mounting plate 71 for translation in precision ways under control of the strip address servo 52 and strip access or insert/remove servo 53 to deliver record strips from the file 50 to a position on the mounting plate surface for mounting on the drum by the drum-loading assembly and for returning strips to the file.

The laser recording unit is sensitive to dust and is therefore enclosed within an airtight cover 81 defining an airtight enclosure with the mounting plate 71. A blower and filter mounted beneath the mounting plate 71 in the console provide air under pressure in the airtight enclosure defined by cover 81 through a hole in the mounting plate 71. In addition, within the airtight enclosure 81 an air-circulating system and filter are provided on the mounting plate 71 for circulating and filtering the pressurized air within the enclosure. Record strips stored in the data strip file are protected from contamination by airtight scabbards in which they are sealed. When a particular record strip is addressed for delivery to the drum, the entire scabbard is retrieved by the data elevator and delivered to the drum-loading assembly which is contained within the airtight enclosure defined by the cover 81 and mounting plate 71. The record strip enters the airtight enclosure at the end of the scabbard through a port engaging the end of the scabbard. Air under pressure in the airtight enclosure escapes through any leakage points to prevent the entry of dust particles.

Electronics for the laser recording unit and format control subsystem are housed within the console below the mounting plate 71 in a series of mounting racks accessible through a plurality of doors 82 along the front of the console. The recorder control subsystem and peripheral units hereinafter described are mounted in a separate cabinet, as is the laser power supply and heat exchanger for cooling the laser head. Electrical connections and waterline connections to units within the console 70 are made through the floor. The air blower and filter for providing filtered air under pressure to the airtight enclosure can be accessed through one of the doors 82 in the front of the console. The secondary filtering system which includes an air-circulating system and filter is provided within the airtight enclosure defined by cover 81 and mounting plate 71.

TRACK POSITION SERVO GROUP

Figure 5:
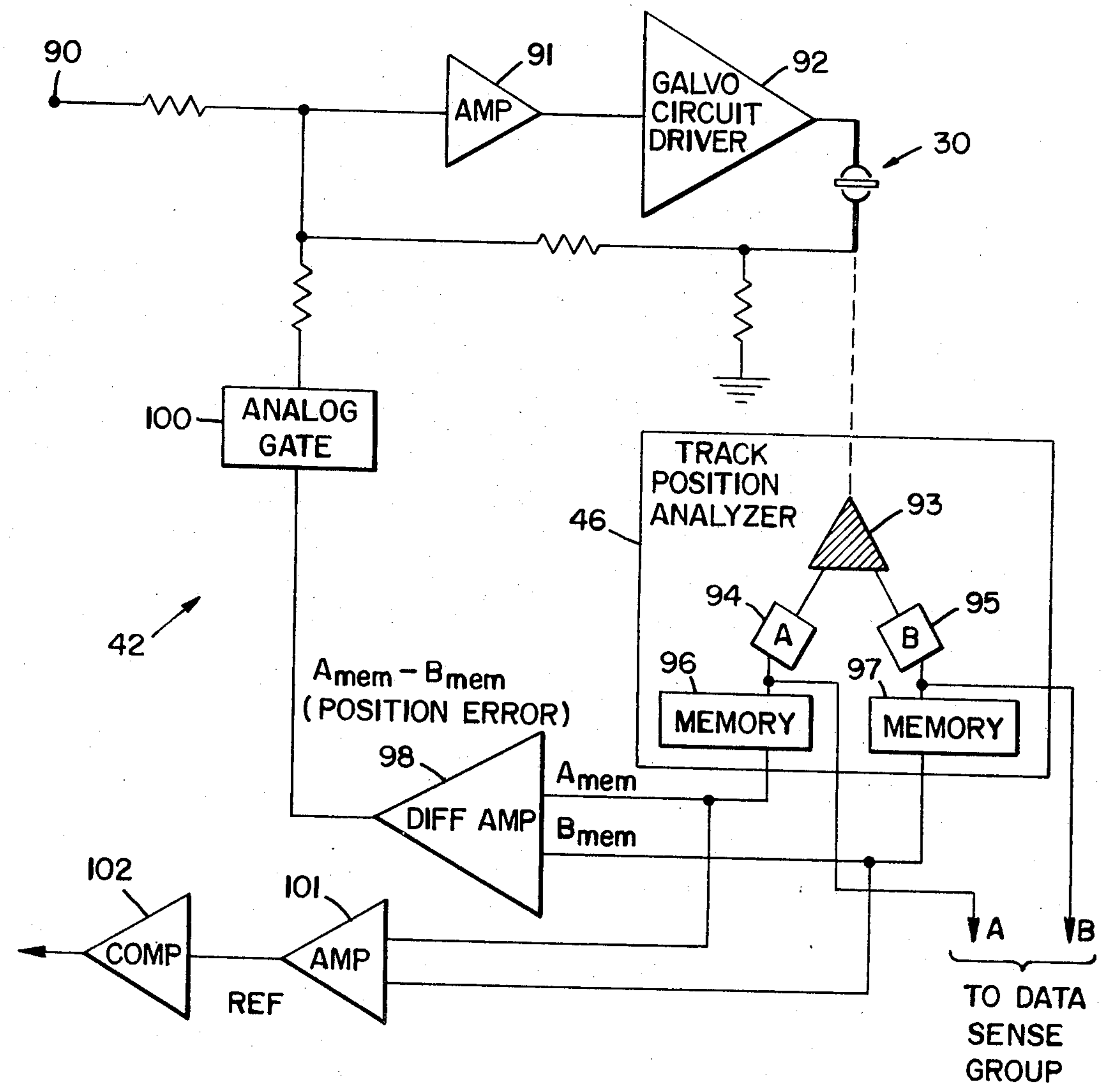
FIG. 5 is a block diagram of the track position servo group of the laser recording unit.

Referring in more detail to the components of the laser recording unit, FIG. 5 is a block diagram of the track position servo group 42 and the track position analyzer 46. During the record mode, the translating carriage 40 which the record/read head 31 and galvanometer mirror 30 are mounted is translated at a uniform velocity across the periphery of rotating drum 32 around which is mounted a flat elongated record strip 33. At the same time, command signals at input 90 control the motion of galvanometer mirror 30 through amplifier 31 and galvanometer circuit driver 92. During recording the galvanometer mirror is driven to produce a sawtooth waveform motion synchronized with rotation of the drum and translation of the carriage to provide a cylindrical row of parallel circular tracks on the record strip. Thus, if the galvanometer mirror 30 were maintained in a constant position during translation of the carriage, a helical track would be recorded on the information storage strip mounted around the periphery of drum 32. In order to provide separate parallel circular tracks, translation by the carriage is compensated for by the command signal which excites in the track position servo a sawtooth waveform having a negative slope equivalent to the carriage velocity. The sawtooth excitation of the galvanometer mirror scans the laser beam in such a manner as to cancel the transverse component of motion produced by the carriage for each circular track around the record strip. As a result, a row of separate linear tracks are vaporized or ablated from the information storage medium strip.

During retrieval or reading of data tracks stored in a data strip mounted on the rotating drum, light reflected back from the medium is directed by the galvanometer mirror 30 and additional optics to a division of wave front beam splitter 93 in the track position analyzer 46. The beam splitter 93 bifurcates the reflected ray providing a pair of beams which impinge upon data-sensing elements 94 and 95 respectively, herein also referred to as data-sensing elements A and B. The data-sensing elements 94 and 95 generate a pair of signals corresponding to the pair of light rays from the bifurcated light beam reflected from the record strip. The signals pass through delay elements or memories 96 and 97, respectively, to a differential amplifier 98 which generates a different signal for feedback control of the position galvanometer mirror. Thus, during readout of stored data, analog gate 100 provides feedback of the difference signal from differential amplifier 98 to amplifier 91 and galvanometer circuit driver 92, thereby providing an additional feedback loop for control of the positioning of galvanometer mirror 30. Analog gate 100 is open during the record mode and closed when the read mode is selected. When the focused laser light beam has acquired a data track on the prerecorded record strip mounted on the rotating drum, the reflected beam is bifurcated to provide the difference signal for maintaining centering of the laser beam over the data track by feedback control of the galvanometer mirror 30. The feedback loop provided through analog gate 100 is superimposed upon control signals received through input 90 thereby providing dual loop feedback control of the galvanometer mirror.

Command positioning of the translating carriage 40 positions the record/read head and galvanometer mirror within the vicinity of a desired track address, i.e., it selects the desired field of view for the record/read head. Command positioning of the galvanometer mirror then permits scanning of the field of view of the microscope objective which forms the record/read head. Address data encoded in a particular track and readout in the reflected beam generates signals at data-sensing element 94 and 95 which after passing through delay elements 96 and 97 are summed by amplifier 101 and fed through comp 102 to the format control subsystem to provide track position data. Because the track position data generated by the track position analyzer is based on the image pattern created by a sequence of data holes, this signal is generated after passage through the delay elements 96 and 97 in order to provide meaningful data. For the same reason, error data fed to differential amplifier 98 is also passed through the delay elements. If the track position data received from amplifier 101 indicates that the desired track has not been selected, further command signals issuing from the format control system are received through the input 90. Such correction command signals are generated by a comparator which compares encoded address data received from amplifier 101 with the desired track address.

Output data, fed to the data-sensing group, is taken directly from the outputs of light data sensing elements 94 and 95 to be summed by the data sense group 47. The data sense group is composed of a summing amplifier for summing the signals from elements 94 and 95, a read level comparator and a record level comparator. Three major outputs are provided from the data sense group to the format control subsystem. During the record mode two outputs are provided, the first a media verification signal which insures that the information storage medium is without defect such as holes, and the second, a record verification signal which is a monitor of the simultaneously vaporized medium to insure correctness of recording. During the read mode, the data sense group provides a reflective readout signal of the recorded information with holes equal to a logical zero.

Figure 5A:
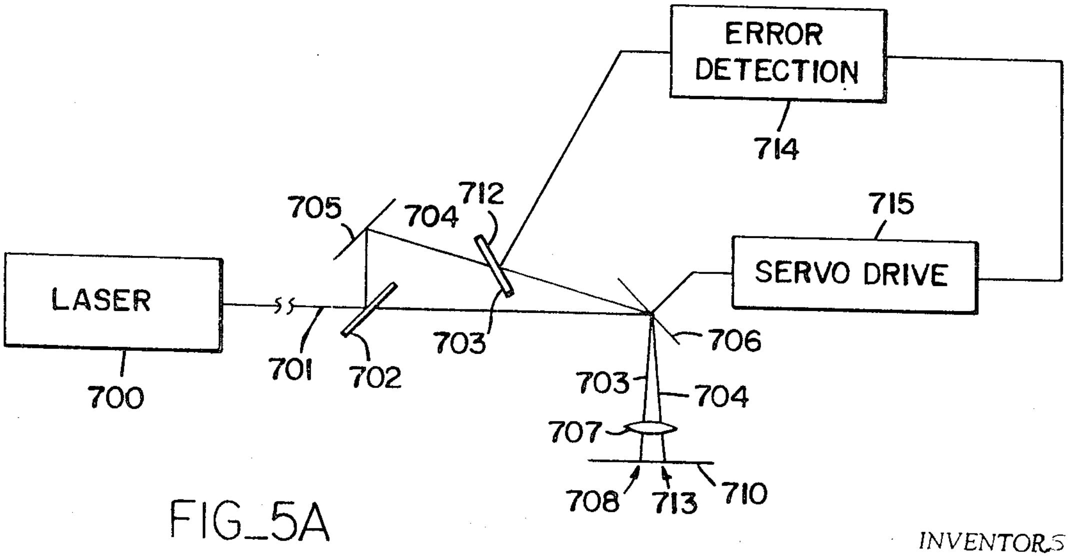
FIG. 5A shows an alternate arrangement for the track position servo group for placement of parallel tracks during data recording.

An alternate arrangement for the track position servo group for placement of parallel tracks during data recording is shown in FIG. 5A. According to this arrangement, laser beam 701 from laser 700 intended for recording data on the recording medium is bifurcated by the beam splitter 702 into separate beams 703 and 704. Beam splitter 702, a division of amplitude beam splitter, is partially mirrored so that only a small percentage of the intensity of laser beam 701 is directed to mirror 705 to form laser beam 704. The major portion 703 of the intensity of laser beam 701 is transmitted through the beam splitter 702 to be centered on galvanometer mirror 706 for deflection through the optical recording head 707 for ablating a new data track 708 on the recording medium 710.

The minor portion 704 of laser beam 701 is directed by the off-axis mirror 705 through beam splitter 712 to the center of galvanometer mirror 706 from which it is deflected through optical recording head 707 to fall on the next preceding already recorded data track 713. The fraction 704 of light deflected by beam splitter 702 to mirror 705 is of a sufficiently low intensity level so that the portion 704 of the laser beam will not ablate or vaporize the laser recording medium. Light reflected from data track 713 is directed by galvanometer mirror 706 and beam splitter 712 to the error detection elements and circuitry 714 including the position of wave front beam splitter and associated circuitry described and illustrated in FIG. 5. The generated error signal by means of servo drive 17 positions the galvanometer mirror 706 so that the portion 704 of laser beam 701 is centered on the already recorded data track 713.

It is apparent that by means of this arrangement, the data track 708 presently being recorded is maintained at a constant distance from the next preceding already recorded data track 713 so that data tracks are maintained in spaced parallel alignment without crossing each other. The spacing between data tracks depends upon the angle $\theta$ between the divided portions 703 and 704 from laser beam 701. The angle $\theta$ between these portions of the laser beam is, in turn, determined by the off-axis spacing of mirror 705 from the axis of laser beam 701. In order to adjust the angle $\theta$ to thereby adjust spacing between tracks, mirror 705 is mounted for translation in order to adjust the off-axis distance from laser beam 701.

LASER INTENSITY CONTROL GROUP

Figure 6:
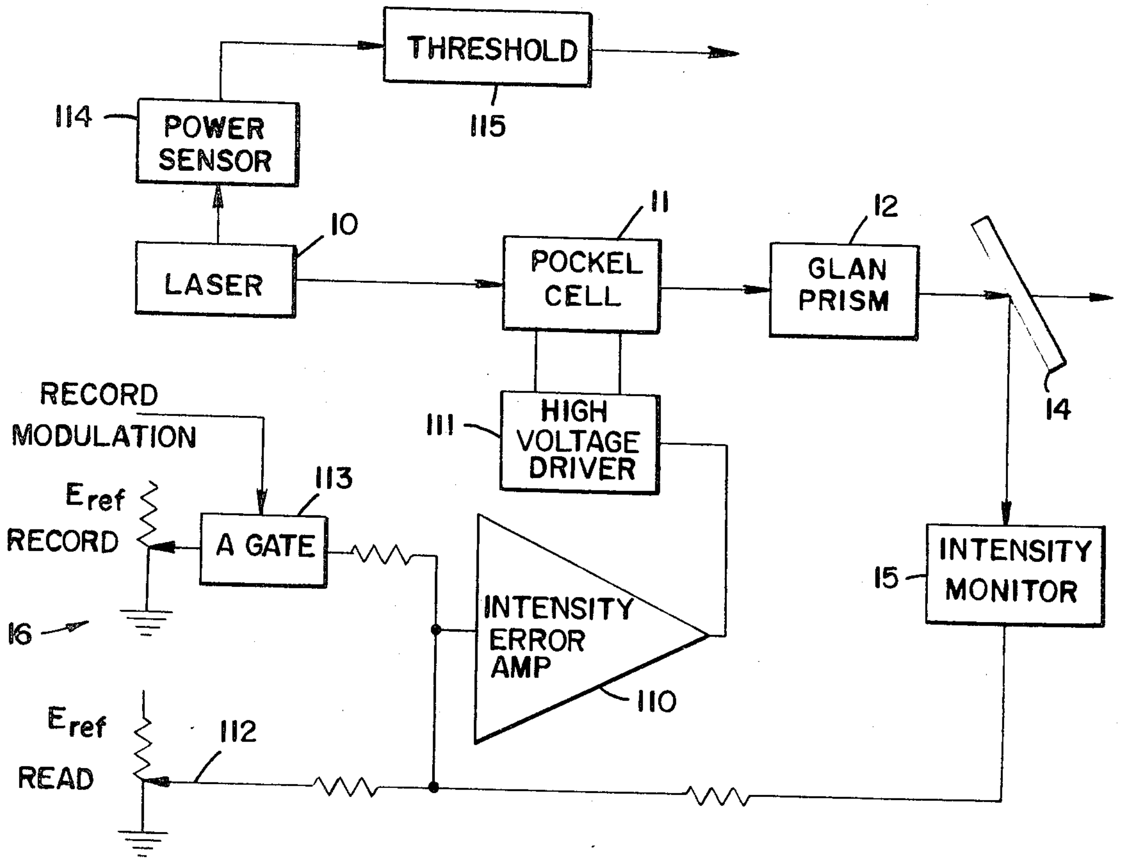
FIG. 6 is a block diagram of the laser intensity control group of the laser recording unit.

The laser intensity control group shown in FIG. 6 provides automatic control of the intensity of the coherent light output from laser 10. The intensity monitor 15, which may be, for example, a solid-state wideband photovoltaic detector, senses a portion of the output from laser 10 reflected by beam splitter 14 with an operational response in excess of 10 megahertz. The fast response of the intensity monitor sensor provides near-instantaneous control of laser intensity during the actual vaporization or ablation of data bits with 250-nanosecond pulses, thereby eliminating all laser power variations. The output from intensity error amplifier 110 to which the intensity monitor signal is fed, in turn, through high-voltage driver 111 controls the Pokel cell light modulator 11. The Pockel cell 11 and Glan prism 12 together act as a voltage-variable light attenuator. The intensity error amplifier 110 amplifies the difference between the reference input and the intensity monitor sensor feedback signal. The read level reference intensity voltage is applied through line 112 to the intensity amplifier 110 and is maintained at a level sufficiently low to prevent ablation or vaporization of the information storage medium. The record modulating reference signal is gated in on top of the minimum read-level voltage through gate 113 to provide a higher voltage level sufficient to ablate or vaporize the information storage medium in accordance with the modulating signal. Instantaneous media verification provided by the read before record data output is rendered possible with laser-intensity switchover between record and read levels.

To insure that the minimum laser power required for recording is available from laser 10, a power sensor 114 monitors the reflecting ray from the laser exit Brewster window. The signal from power sensor 114 actuates a threshold circuit 115 to provide a laser power ready verification signal to the format control logic.

As another embodiment of the invention, a small read-only machine for optically retrieving data stored in the recording medium is provided. In this embodiment a small noncoherent light source such as collimated argon light or a geodiode provides the light signal for data retrieval. There is no necessity for coherent laser light when only data retrieval is performed.

DRUM MOTOR SPEED SERVO GROUP

Figure 7:
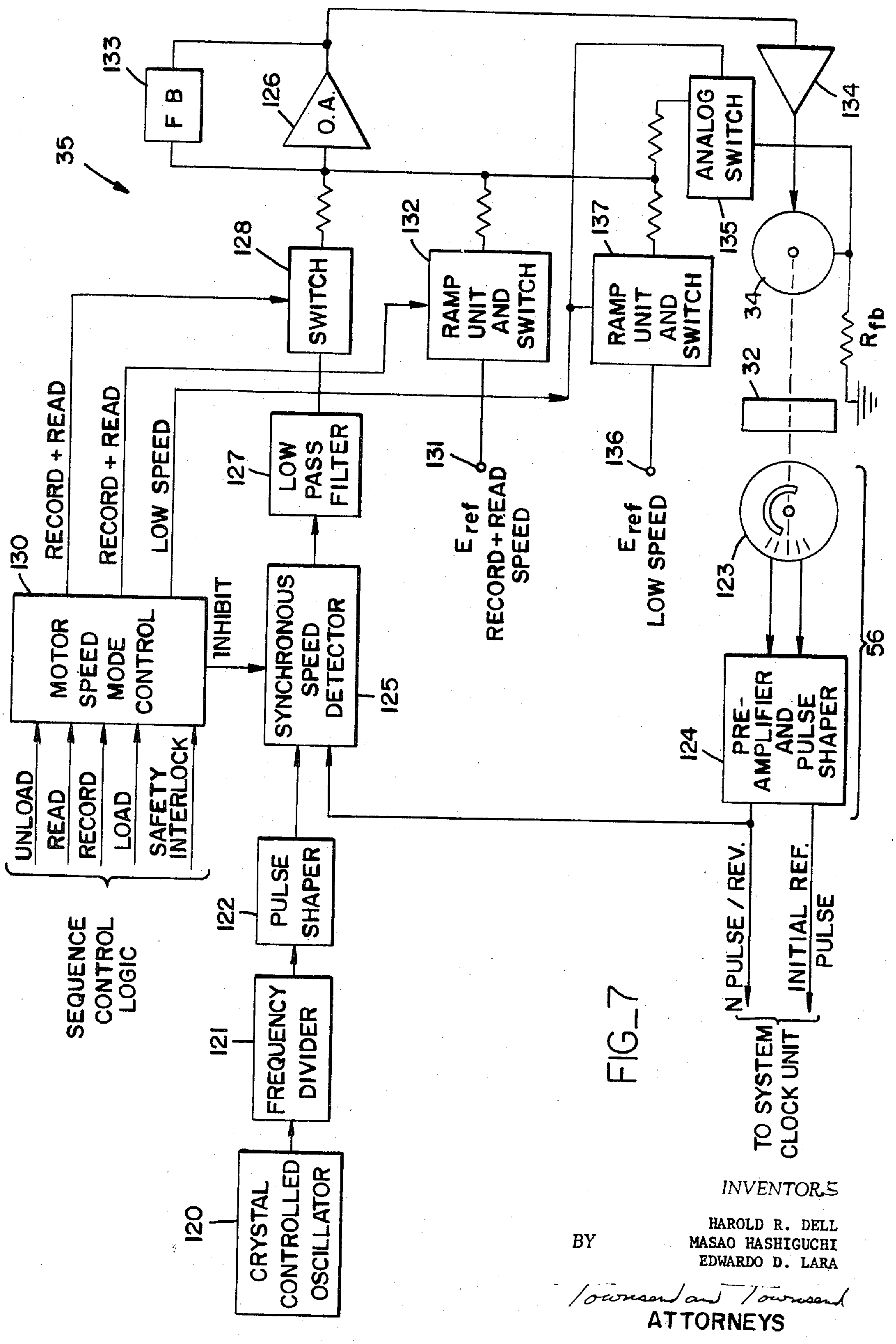
FIG. 7 is a block diagram of the drum motor speed servo group of the laser recording unit.

The drum motor speed servo group 35 illustrated in the block diagram of FIG. 7 controls with a high degree of accuracy the speed and instantaneous positioning of the shaft of printed circuit motor 34 despite the presence of disturbing torques or electrical drifts. The drum servo speed control group is analogous to an AC synchronous motor in that the synchronous speed of motor 34 is locked to an accurate reference frequency. The reference frequency is provided by crystal-controlled oscillator 120 having an output fed through frequency divider 121 and pulse shaper 122.

Printed circuit motor 34 drives the drum 32 and an optical tachometer 123 coaxially mounted for rotation with the drum 32. The optical tachometer is an accurate optical system consisting of a coded glass disk mounted on the motor shaft and a light whose output is modulated by radial slits in the rotating disk. A photoelectric readout assembly including a light detector generates a signal having a frequency proportional to the rotation of the disk, drum and motor. The light detector can be, for example, a photodiode or equivalent photosensor. The output signal from the photosensor is amplified and shaped by preamplifier and pulse shaper circuit 124. The pulse shaper circuit output consists of a series of sharp rise time, short-duration pulses.

The reference frequency signal output from the crystal control oscillator is also shaped into a series of sharp rise time, short-duration pulses after passing through pulse shaper circuit 122, and the reference frequency signal and optical tachometer output signal are simultaneously fed to a synchronous speed detector 125, consisting of digital logic circuits. The synchronous speed detector logic circuits make continuous determination as to whether the motor speed is too slow, too fast, or synchronized with the reference frequency. The master reference frequency is adjusted to provide a velocity of rotation for the motor and drum suitable for the record and read modes, the operation of the drum servo speeds control group being identical in both modes. When the optical tachometer output signal and reference frequency signal are in synchronism, the synchronous speed detector logic circuits also determine the electrical phase angle between the reference pulse and the feedback pulse from the optical tachometer.

The synchronous speed detector 125 provides one of three output signals depending upon the conditions of the input signals. When the motor speed is too slow, the output signal from synchronous speed detector 125 causes motor acceleration, while when the motor speed is too fast, the output from the synchronous speed detector causes motor deceleration. In the synchronized condition, the output is in a square wave and the square wave is symmetrical. As the instantaneous speed of the motor tends to vary, the square wave output from synchronous speed detector 125 is width-modulated. Width-modulation of the otherwise symmetrical square-wave form provides a correction in the motor speed through application of a DC error voltage to summing amplifier 126. Thus, the output from synchronous speed detector 125 is applied to a low-pass filter 127 which removes the basic carrier frequency, namely, the reference frequency. The low-pass filter averages the pulse width modulated square wave to obtain a DC correction voltage. The filtered output voltage is applied to summing amplifier 126, an operation amplifier, through switch 128. The switch 128 is closed to permit passage of the low-pass filtered voltage only when the motor and drum are running at the record or read speed as dictated by motor speed mode control 130. Switch 128 is opened when the motor and drum are operating at low speed during loading and unloading.

The DC offset voltage applied to summing amplifier 126 is selected by the motor speed mode control 130 in accordance with the appropriate sequence of operations dictated by the sequence control unit 18. Thus, in the record or read mode, the servo loop through switch 128 is closed and an appropriate voltage applied at input 131 through switch 132 to summing amplifier 126. Summing amplifier 126 can be, for example, an inverting, high-gain operational amplifier having a feedback network 133 which establishes desired system gain and frequency characteristics. The output from summing amplifier 126 drives a power amplifier 134, a noninverting current amplifier which develops an output current proportional to its input driving voltage. The output current from amplifier 134 is applied to the motor armature and can be monitored by a current-monitoring resistor $R_{fb}$. The voltage developed across $R_{fb}$ is fed back to the summing amplifier through a feedback resistor. Voltage feedback from resistor $R_{fb}$ to the summing amplifier 126 is controlled by the analog switch 135, in turn controlled by the motor speed mode control 130.

During the loading and unloading steps the motor and drum rotate at a slower rate and the motor speed mode control 130 reflects the appropriate voltage through input 136 and switch 137 through summing amplifier 126. In order to provide smooth acceleration and deceleration as the motor and drum speed change, switches 132 and 137 are associated with input circuits for generating appropriate ramp functions for the voltages applied in inputs 131 and 136.

The motor speed control unit 130 provides speed select and turnoff control for the motor and associated units of the laser recording unit. The motor speed mode control receives system status and mode select signals from the format control subsystem and, in turn, commands the switches 128, 132, 137 and 135. Safety interlock signals to the motor speed mode control force motor turnoff if any interlock condition so requires.

CLOCKING UNIT

Figure 8:
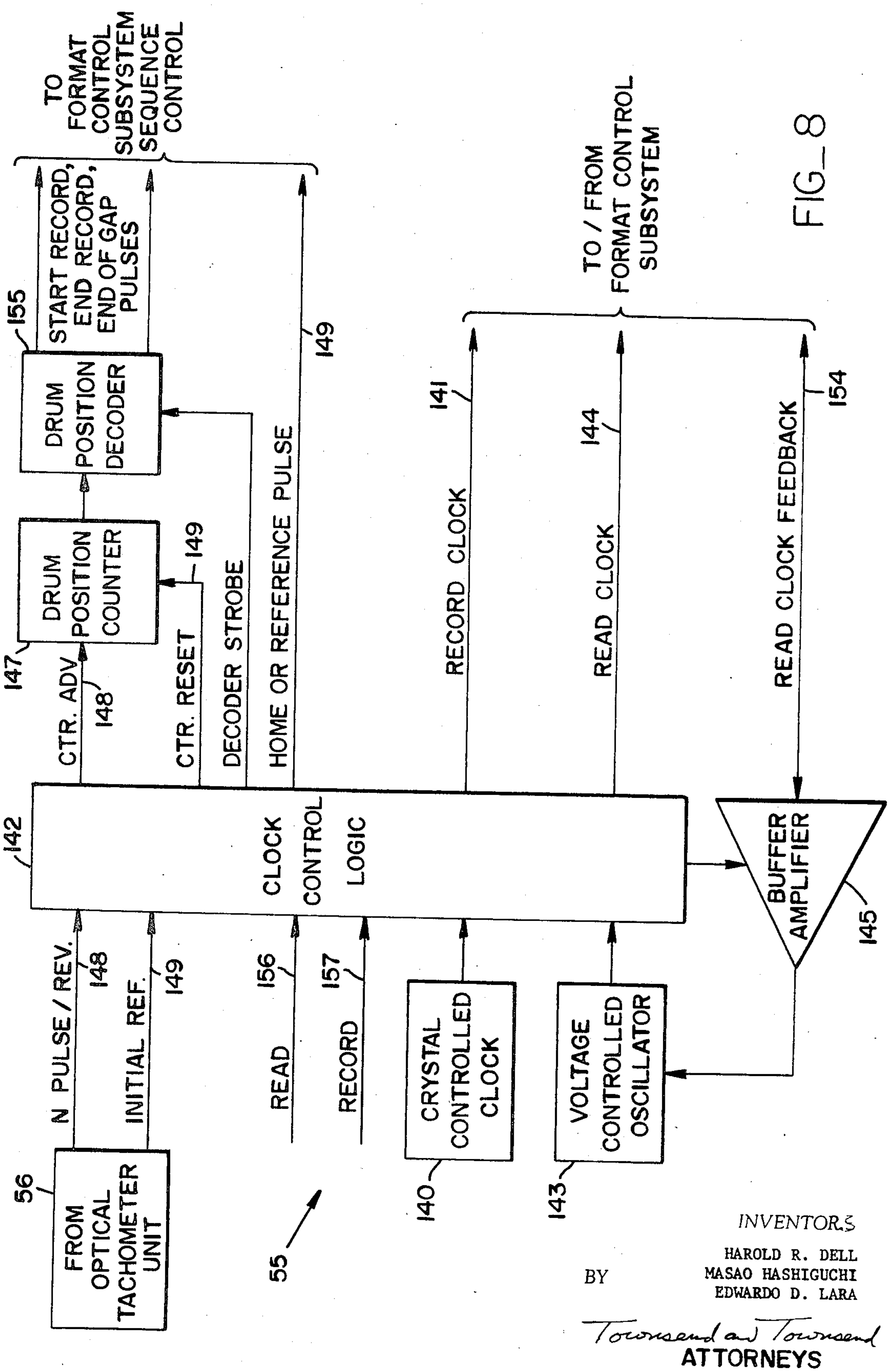
FIG. 8 is a block diagram of the clocking unit of the laser recording unit.

The clocking unit 55 shown in block diagram in FIG. 8 provides the timing signals for the sequence control unit 18 and format control subsystem 20. During the record mode, the highly stable crystal-controlled clock 140 provides the record clocking signals 141 via clock control logic 142. In the read mode, the voltage-controlled oscillator 143 provides the read clocking signals 144. By means of error voltage feedback, the voltage-controlled oscillator is synchronized with a character-oriented clock consisting of clocking signals 154 stripped or removed from output data with which it was previously interleaved during recording. Thus, the character-oriented clock signals 154 are derived from data read from the high-density recording strips. Feedback from the voltage-controlled oscillator 143 and the character-oriented clock signals 154 are fed to the buffer amplifier 145 for comparison. Any deviation between the two will cause a frequency correction error voltage to be applied to voltage-controlled oscillator 143 to synchronize the two. Thus, the voltage control oscillator and its feedback loop provide a frequency servo which follows the frequency of the character-oriented clock.

The clocking unit via clock control logic 142 also provides a home or reference pulse 149 derived from the output of the optical tachometer 123. A track on the coded disk of the optical tachometer 123, which is opaque for 180° and clear for the remaining 180° of rotation, is optically sensed to produce a home pulse which is referenced to the gap between the abutting ends of a record strip mounted around the periphery of the drum, so that the home pulse occurs at a short period of time before the laser beam from the record/read head seans the gap between the abutting ends of the record strip. The second track on the coded disk which may comprise a circle of radial slots to provide the speed control feedback pulses, is also used to provide position indication for the drum. Pulses 148 generated from the second coded track advance a drum position counter 147 which is reset every drum revolution by the home pulse 149. The drum position counter outputs are decoded by the coder 155 to provide start-record, end-record, and end-of-gap pulses to the format control subsystem 20.

Appropriate operation of the clocking unit and clock control logic 142 for the read and record modes is provided by read and record command signals 156 and 157, respectively, fed to the clock control logic from the format control subsystem.

RECORDING MEDIUM

Figure 9:
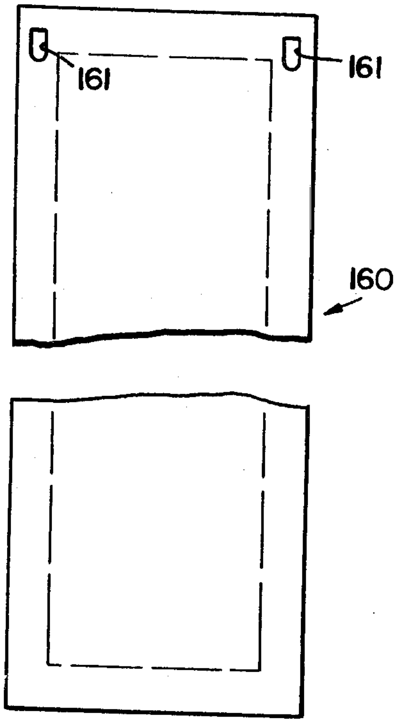
Figure 9A:
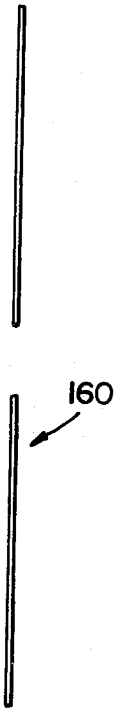
Figure 9B:
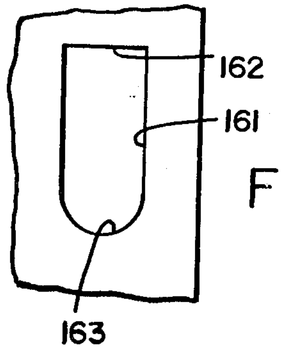
FIG. 9B is a detailed view of a hole formed in the record strip.

In a preferred form of the invention, the energy-absorbing information storage medium ablated or vaporized by the laser beam is formed in the configuration of a flat elongate record strip having dimensions, by way of example, of 4¾ inches wide by 31¼ inches long by 7 to 10 mils thick. The record strip 160 illustrated in FIGS. 9 and 9A is provided with a pair of holes 161 at one end of the strip, to facilitate mechanical mounting of the strip around the periphery of the record drum as hereinafter described. As shown in FIG. 9B, each hole 161 is formed with a precision edge 162 for precision positioning of the strip 160 on a pair of pawls and a rounded edge 163 for easy removal from the pawls as hereinafter described. The record strip can be formed of a flexible substrate of a material such as Mylar on which at least a layer of energy-absorbing material is coated. Particular materials and parameters for the substrate and coatings are set forth in copending U.S. Pat. application Ser. No. 682,478, filed Nov. 13, 1967, entitled "Laser Recording Method and Apparatus," and U.S. Pat. application entitled "Laser Recording Medium," inventors: Carl H. Becker, Harold R. Dell and Keith E. McFarland, filed on even date herewith, both applications assigned to the assignee of the present case.

For a recording medium strip of the size set forth above, a total net data capacity of approximately $1.96 \times 10^9$ bits or 245 million bytes is possible. This capacity is available with a square bit cell size of 4 microns on the side, allowing a bit density of 6,350 bits per inch along each longitudinal parallel data track of the medium and thus approximately 198,500 bits per track. A center-to-center track spacing across the record strip of approximately 8 microns provides a track density of 3,175 tracks per inch of recording medium strip width. Approximately 11 percent of the recorded bits are used for clocking and control purposes as hereinafter described in the section relating to the format control subsystem leaving approximately 175,000 bits per track for the net data recording capacity. With about 11,200 tracks recorded on each strip, the total net data capacity of the strip is therefore $1.96 \times 10^9$ bits or 245,000,000 bytes. With a drum size suitable for receiving the record strip around its periphery, a data transfer rate of 4,000,000 bits or 500,000 bytes per second can be obtained at a drum rotation speed of 22.9 r.p.s. With a record strip size as set forth above, by way of example, and a data-packing density as set forth above, a bit error rate of approximately one bit in $10^9$ data bits is provided by the present invention. It is apparent that the record strip data configuration can be designed in a variety of ways to, for example, decrease or increase the data bit density or to increase or decrease redundancy.

Figure 10:
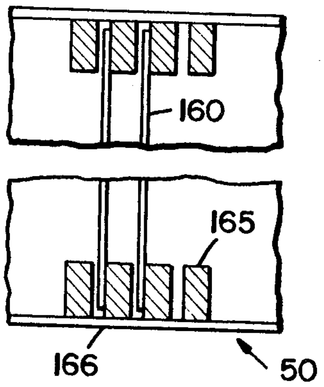
FIG. 10 is a fragmentary plan view of the record strip file or magazine.

A removable and replaceable strip magazine or data file 50 shown in FIG. 10 is provided for housing 16 record strips within protective channels formed by projecting ribs 65 along the sides 66 of the magazine. The data file is accessible for removal and replacement through a door inside the console. The record strip file unit is suitable for mounting record strips of the dimensions set forth above, by way of example, in a single row with the record strips oriented vertically.

DRUM LOADING AND UNLOADING

One example of a strip selector apparatus and associated operating steps for loading and unloading the drum is shown in FIGS. 11 and 12, with details of the drum shown in FIGS. 13, 14 and 15. According to the example illustrated in FIGS. 11 and 12, the data strip file or magazine 50 is positioned on tracks, not shown, within the console beneath the rotating drum 170. The desired data strip 160 within magazine 50 is addressed by lateral translation of the magazine 50 back and forth on the tracks, not shown, beneath and in alignment with the peripheral surface of the drum. When the magazine 50 is positioned on the track, by for example, a servomotor, at the proper address for removal of the desired strip, the movable piston 173 on the strip ejector 172 is projected upward against the data strip pushing the strip upward until it is engaged between two pairs of rollers 171 positioned above the magazine as illustrated in FIG. 11A. The rollers 171 are positioned with one pair on each side of the magazine 50 so that the rollers engage only the sides of the data strip without contacting the data storage portion of the record strip surface. As the selected data strip 160 is pushed upward by the piston 173 of strip ejector 172, a strip photosensor 178 senses the presence of the strip above magazine 50 and activates rollers 171 which engage the strip and actively lift it vertically from the magazine 50. The rollers 171 are driven by a motor, not shown, and carry the data strip upwards into a chute 174 which directs the data strip towards the drum 170. As shown in FIG. 11G, the strip chute 174 encloses the data strip 160 and engages the strip by means of rollers 175 at the sides of the strip driven by motor 176. Referring to FIG. 11B, rotation of the drum 170 is synchronized with motion of the data strip so that as the top of the strip 160 approaches the peripheral base of drum 170, a pair of pawls 177 extending from the sides of the drum approach the end of the data strip and engage the holes provided at the end of the strip as heretofore described. As shown in FIG. 11C, the pawls engage the holes of the data strip pulling it upwards and around the rotating drum 170.

As the data strip 160 first emerges from the chute 174, a second strip photosensor 180 activates a pair of rollers 181 which are urged against the strip 160 and the peripheral face of drum 170 to further aid in urging the strip against the face of the drum. The drum itself is provided with internal channels 182 and 183 for applying a vacuum or supplying air pressure as the case may be to the peripheral face of the drum. In the position shown in FIG. 11C, a vacuum is applied to channel 182 so that the record strip is further retained by air pressure against the base of the drum. The vacuum applied by channel 182 is distributed along the peripheral base of the drum by a grid of grooves or channels as hereinafter described. Thus, as the drum rotates, further drawing the strip 160 around the base of the drum as illustrated in FIG. 11D, the vacuum applied to channel 182 is distributed sequentially around the peripheral face of the drum through the grooves and channels as the data strip sequentially covers the rotating peripheral drum face. Finally, as shown in FIG. 11E, the record strip 160 is retained concentrically around the peripheral face of the drum and a second vacuum applied through channel 183 securely retains the strip against the face of the drum from the opposite end of the strip. The strip photosensor 180 thereafter deactivates the rollers 181 which fall back from the drum surface.

Figure 11G:
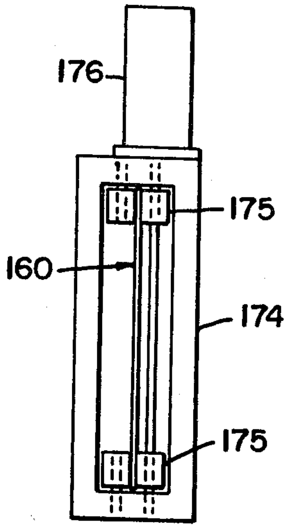
Figure 11F:
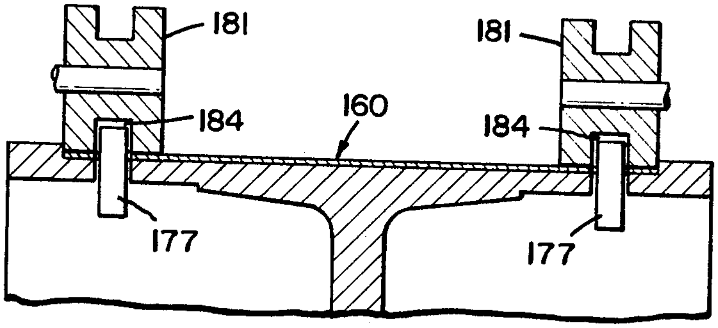
Figure 11A:
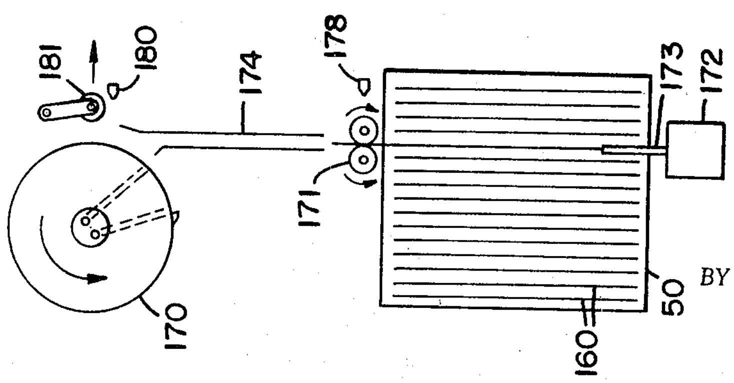
Figure 11B:
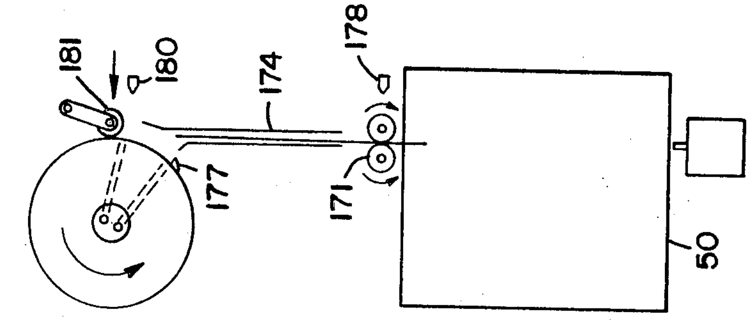
Figure 11C:
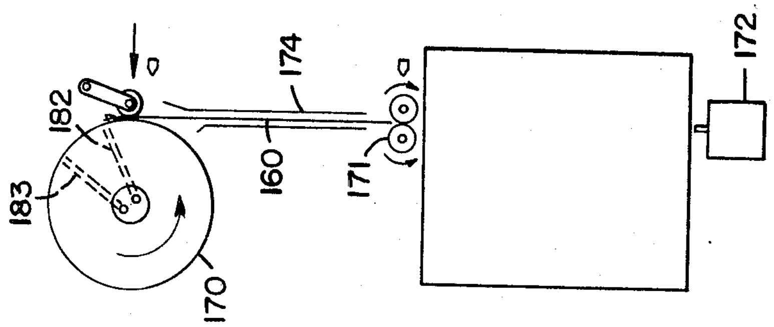
Figure 11D:
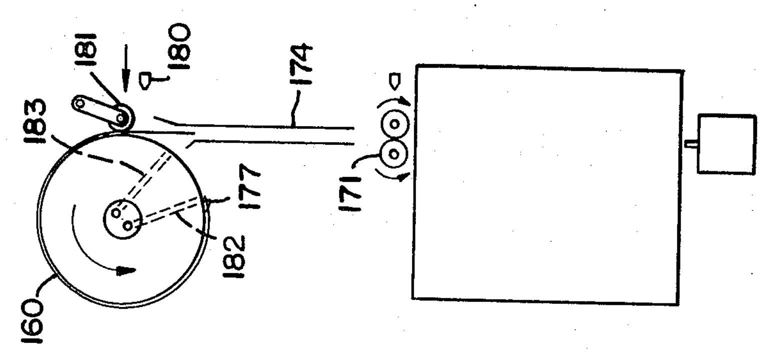
Figure 11E:
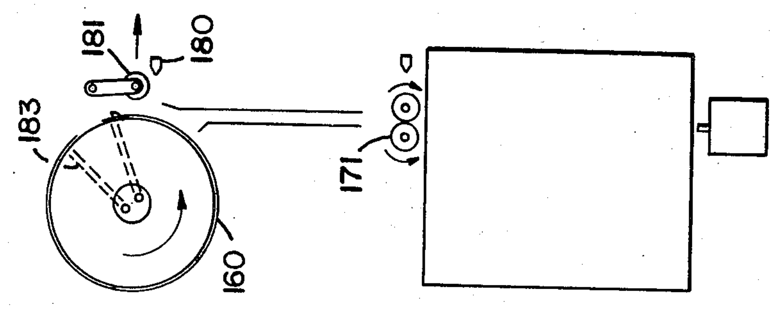

In order to prevent interference between the rollers 181 and pawls 177 when the rollers 181 are applied against the surface of drum 170, the rollers are formed in the configuration shown in FIG. 11F. Thus, each of the rollers 181 is generally H-shaped in cross section so that the pawls 177 pass through the channel 184 formed in the roller. As further shown in FIG. 11F, rollers 181 engage the record strip 160 only at the sides of the record strip so that there is no contact against the information storage portion of the medium surface.

Figure 12E:
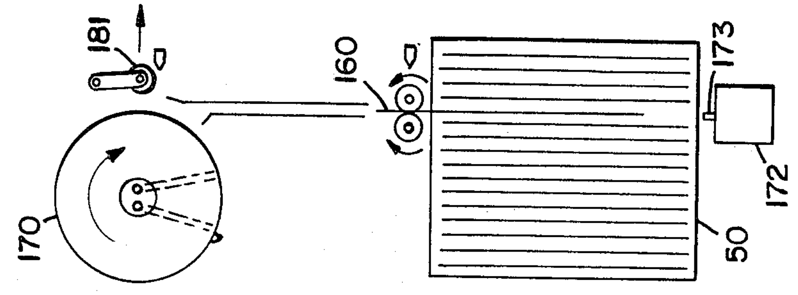
Figure 12D:
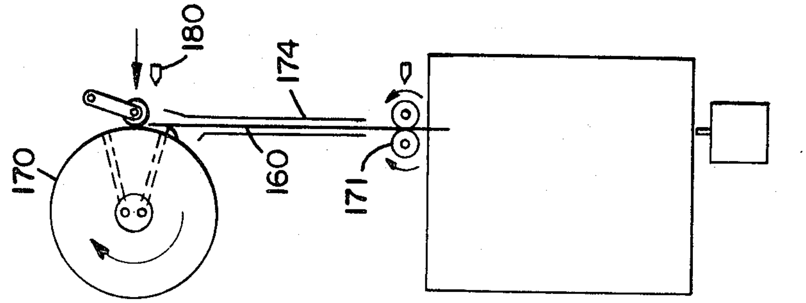
Figure 12C:
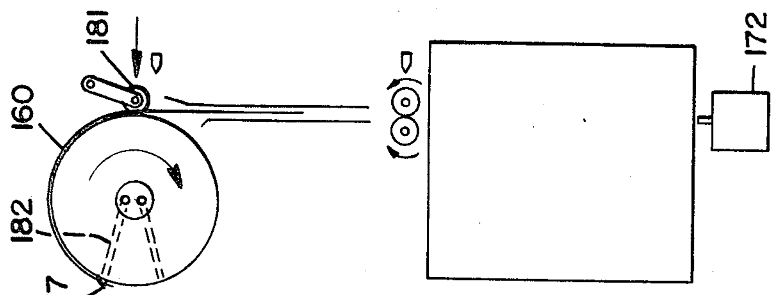
Figure 12B:
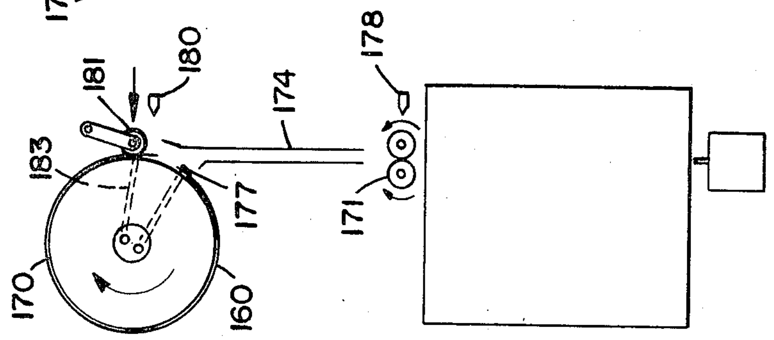
Figure 12A:
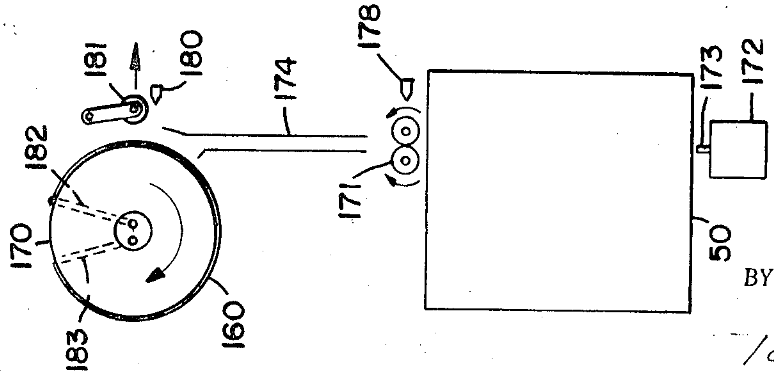

The unloading operation is somewhat the reverse of the loading operation described above. In order to unload a record strip mounted around the peripheral surface of drum 170, the drum is first slowed to a stop and the direction of rotation reversed. The appropriate address in data file or magazine 50 for receiving the mounted record strip is first appropriately positioned beneath the rollers 171 and strip chute 174. Strip ejector 172, by means of movable piston 173, checks to insure that the address for receiving the data strip is empty. As the end of data strip 160 adjacent channel 183 in the drum 170 approaches the strip chute 174, rollers 181 are activated to provide a perpendicular force against the data strip 160. Positive air pressure is thereafter applied through the channel 183 in order to blow the end of data strip 160 away from the record drum 170. Because of the force in the opposite direction from roller 181, the record strip 160 leaves the drum 170 in a generally tangential direction into the strip chute 174 as shown in FIG. 12C. Upon further rotation of the drum 170 as shown in FIG. 12D, the vacuum is removed from channel 181 and the data strip 160 freely falls from pawls 177 for transfer of the strip 160 through the chute 174 into its appropriate address in magazine 50. Rollers 181 thereafter fall back from the face of drum 170. As the record strip 160 emerges from the bottom of the transfer chute 174, strip photosensor 178 sensing the presence of the data strip activates rollers 171 to rotate and appropriately engage the sides of the record strip to transfer the record strip into its appropriate address in the magazine 50. Completion of the unloading operation is shown in FIG. 12E. The selector apparatus and drum are thereafter ready for loading another record strip onto the drum.

As shown in FIGS. 13, 14 and 15, the drum 170 is provided with a cylindrical face 190 having a grid of grooves or channels 191 formed in the cylindrical face. The vacuum is applied to the face of the drum through separate channels 182 and 183 supplied through axial conduits 182A and 183A respectively formed in the axle 192 of the drum 170. The drum 170 is generally hollow and formed with holes 193 in the side thereof to decrease the weight and inertia of the drum. The peripheral face 190 is supported by a central disk portion 198 extending from the axle 192 of the drum 170. Each of the grooves and channels of the grid 191 communicate with the channels 182 and 183 through which the vacuum is applied through holes in the face of the drum. As shown in FIG. 15, the density of the grooves and channels of grid 191 is greater in the region of the channels 182 and 183 where the ends of the data strip are retained against the face of the drum. This greater density provides a lower pressure beneath the ends of the data strip where it must be most securely retained against the drum. As shown in FIGS. 13 and 15 and in the detailed cross section of 13A, the edges of the cylindrical periphery 190 of the drum are bonded by hubs 194 and 195. The hub 194 provides a precision vertical index edge 196 against which the data strip 160 is urged. Hub 195, on the other hand, is formed with an inclined inner edge 197 so that upon application of a vacuum through channels 182 and 183 to the undersurface of the data strip, the portion of the data strip resting upon the inclined edge 197 urges the data strip against index edge 196 to aid in precision positioning of the data strip on the peripheral face of the drum.

By means of the grid 191 of channels and grooves formed in the peripheral face 190 of the drum 170, a vacuum applied through channel 182 to the face of the drum during the loading operation is sequentially applied to the undersurface of the data strip thereby retaining the strip as it is sequentially wrapped around the drum. This result is achieved because the record strip itself forms the top of a vacuum chamber formed by the grooves and channels and the effectiveness of the vacuum increases as the area covered by the record strip increases during rotation of the drum during the loading operation.

LINEAR CARRIAGE

The linear translating carriage 40 on which are mounted the mirror galvanometer 30 and the optical record/read head 31 is located adjacent the periphery of drum 170 and is controlled by the carriage position servo group, as shown in the diagrammatic views of FIG. 1. In the detailed views of FIGS. 16, 16A and 16B, the carriage assembly 201 is mounted with precision ball bushings, not shown, to an adjustable frame 203 having terminal portions between which precision ways or rods 204 are connected. The frame 203 is attached to the laser recording unit mounting platform. The precision bushings support the linear carriage and retain the carriage 201 in the correct plane during translation along the rods or ways 204. As a result, during translation, the carriage remains parallel to the surface of the drum and to the axis of drum rotation. The galvanometer mechanism 205 and associated mirror 202, and the objective lens assembly 206 which forms the read/write head of the laser recording unit are mounted on the bushing-supported carriage. The mirror galvanometer 205 is also mounted on a manually adjustable pitch and yaw mechanism 209 for adjusting the initial orientation of the mirror in the optical path of the laser beam.

The carriage is driven along a stroke of, for example, 4, 5 inches by a precision stainless steel belt mechanism 207 that is pinned to pulleys 208 at each end of the carriage track. One pulley is driven by a servomotor which can either be slewed or driven at a slow rate. During the write mode, the carriage position is determined from data optically read from a precision incremental encoder plate providing data on the position along the 4.5-inch stroke to better than one part in 10,000. Carriage position, velocity, and acceleration data id provided to the sequence control unit from the count state and count rates of the incremental encoder. During the read mode, carriage position is determined from a count of the recorded data tracks on the record strip optically sensed by the read head. As an alternative, the incremental encoder plate can be utilized to determine carriage position during the read mode. Instead of a linear incremental encoder plate, a rectilinear potentiometer such as the Beckman 421–0400 can be used, mounted at position 210. By way of example, the carriage-positioning servo group is adjusted to position the optical record/read head 206 within the 415-inch region of travel of the carriage to an accuracy of 0.001 inch within less than 400 msec.

READ CALIBRATION MODE

When a high-density recording medium strip is wrapped around the record drum, there may exist an axial offset and/or skew in the position of the strip wrapped on the drum. If the record strip is skew mounted, the abutting ends of the record strip may not be precisely aligned so that one end of each data track does not coincide with the other end of the data track across the gap at the intersecting ends of the record strip. If axial offset occurs, the record/read head mounted on the translating carriage may be positioned to read out track N but actually reads out track N±Δ where Δ depends on the direction and extent of axial displacement. Despite vacuum holddown and the use of an inclined edge for retaining the record strip, axial offset or skew may occur due to tolerances in the recording strip material, and the strip loading and retaining mechanisms. In order to compensate for axial offset and/or skew, a read calibration mode is initiated by the recorder control subsystem whenever a high-density recording medium strip has been loaded on the drum for data retrieval. As soon as the drum is loaded with a recording strip for data retrieval, a ready-status indicator is activated which notifies the recorder control subsystem that the laser recording unit is ready for processing according to the read calibration mode under the control of the programmed processor of the recorder control subsystem. The laser recorder unit is then set in the read calibration mode through an instruction from the programmed processor.

During the read calibration mode, a carriage address buffer register receives data from the recorder control subsystem, and the carriage assembly and record/read head mounted thereon is positioned to read the track specified by the data. Upon receipt of a home or reference pulse, the laser recording unit tracking servo will attempt to acquire a track within an alloted period. If no track is acquired during that period, the laser recording unit awaits the next home pulse when the next attempt to acquire a track is initiated. A fail-to-acquire status indicator is activated to notify the recorder control subsystem that no track was acquired. If a data track has been acquired, which would normally be the case, data readout from the acquired track is transmitted to the format control subsystem. The data format includes a repeated clock-synchronizing sector or pattern which precedes the actual data blocks. The format control subsystem synchronizes with the data clock readout from the data track and transfers the output data into the recorder control subsystem. A track identification number is enclosed in the first data word after the end of the synchronizing clock pattern. If synchronization with the data clock has not occurred, no further data transfer occurs and the tracking servo of laser recording unit must reacquire the track at the next home pulse. After a track has been acquired, the data from the track is transferred to the format control subsystem and the recorder control subsystem processes the data and makes decisions whether to transfer information to a track skew correction buffer register and a track carriage address buffer register. Output data from one record strip track is insufficient to generate such information and no data transfer to these registers occurs. As the mirror galvanometer of the tracking servo traverses across the intersection between abutting ends of the record strip, the laser beam acquires the closest data track. Output data from this track is transferred through the format control subsystem to the recorder control subsystem which compares the second track identification with that of the first track previously transferred and determines the magnitude of skew. If the two track numbers match, the magnitude of skew is zero and the ends of the recording medium are precisely aligned. In order to determine whether axial offset exists, the first track identification number retrieved is compared with the track identification number corresponding to the carriage position previously specified. If the two track numbers match, the magnitude of axial offset is zero. If skew or axial offset exists, the recorder control subsystem will transfer a correction factor to the track skew correct buffer register or the track carriage address register, respectively.

The contents of the track skew correction buffer register control the slope of a ramp generator which drives the galvanometer mirror in the desired sawtooth waveform motion. The output from the skew correction buffer register is converted to an analog voltage through a digital to analog converter, and the current is thereafter applied to the ramp generator. The ramp generator output is summed into a summing amplifier for the mirror galvanometer control so that the galvanometer mirror thus follows the skewed track. At the end of the data being retrieved, the ramp generator output is discharged to zero. The recorder control subsystem will process additional track identification data and transfer new correction factors. The recorder control subsystem determines what range of correction factors will compensate for track skew and chooses the median value or best bit correction factor for use during retrieval of data in the read mode. At the same time, the determination of the best bit axial offset factor is also calculated. The recorded control subsystem transfers the best fit skew correction factor to the skew correction buffer register and stores the best bit axial offset correction factor for use in determining carriage addresses. The recorder control subsystem thereafter transfers an instruction which terminates the read calibration mode and commences retrieval of data in the read mode. Because of the great number of tracks across a recording medium strip, the skew angle may change slightly across the strip. To this end, the recorder control subsystem has a programmed option which permits recalibration of the skew correction factor.

FORMAT CONTROL SUBSYSTEM

The format control subsystem 20 shown in more detail in the block diagram of FIG. 17 provides an interface between the recorder control subsystem 60 subsequently described and the laser recording unit. During the operations of loading and unloading record strips on the record drum, during reading and recording, and during error detect registration and remedial actions, the format control subsystem establishes timing requirements and accomplishes data assembling and transmission. The format control subsystem provides continuous communication and smooth transmission of data between a program processor in the recorder control subsystem and the laser recording unit which is controlled thereby during read and write functions and associated operations. Data transmission between the format control subsystem and the interface of the program processor in the recorder control subsystem is carried on in a word parallel fashion in response to appropriate requests.

During recording, the laser recording process is executed in a serial bit-by-bit basis which requires that information transmitted from the format control subsystem for recording be serialized. In addition, the auxiliary clock and verification signals are logically interleaved with the serialized input data. The clock signals provide a timing reference for retrieval synchronization, within the stored information. The verify signals are two types, the data segment verify signal which determines the recording validity of the preceding data segment, and the check sum verify signal which is a two-byte oriented accumulated check sum verification for each block or string of 256 eight-bit characters of 128 16-bit (two-byte) data segments. The sequence of serial information flow is controlled by the sequence control unit which, through a common bus, enables the contents of a selected intermediate data storage element to logically interleave and combine with the preceding data flow for transmission to the laser recording unit for permanent recording.

During retrieval, the format control subsystem determines the validity and destination of retrieved information, performs remedial actions and returns to normal operation after completion of such actions, and logically removes all clock and verify signals from the serial data while maintaining a smooth flow of output data.

In FIG. 17, the principal logical blocks in the organization of the format control subsystem are shown. The data buffer register 250 receives and provides intermediate storage for information being transferred from the recorder control subsystem 60 to the data-holding registers 260 for recording and being transferred in the opposite direction during readout. The data-holding shift registers 260 include two registers 261 and 262 and associated gates which provide holding capacity for information to be recorded during the record mode or to receive in a serial fashion output information from the read-to-verify shift register 263 during the read mode. The shift registers provide a simple structure to coordinate information when serializing data to be recorded or when receiving serialized data during the read operation.

The character-composing shift registers 270 are formed by two eight-bit juxtapositioned shift registers 271 and 272 which perform the dual tasks of providing storage for segmented information currently being transmitted for recording and for generating the two-byte oriented algebraic check sum for a block or string of segmented information passing through the registers 271 and 272. This check sum provides a simple block retrieval verification during readout of information and during diagnostic reading modes as hereinafter described and supplies the check sum for recording with each string or block of data segments.

The arithmetic system 280 is composed of an eight-bit adder 281 and a 16-bit accumulator, in turn formed by an eight-bit least significant accumulator portion 282 and an eight-bit most significant accumulator portion 283. The least significant portion of the accumulator is a single-rank parallel register, while the most significant accumulator portion 283 is a simultaneously clocked counter. The eight-bit adder 281 operates in a parallel mode. As each eight-bit data byte is positioned in the character-composing shift register 271, the value of the byte is added to the contents of the least significant accumulator section 282, and the most significant accumulator section will be incremented by one by the bit carry of the adder 281. At the completion of repeated addition for 256 eight-bit characters or bytes, the contents of the accumulator sections 282 and 283 can be interpreted as a byte-oriented algebraic check sum of a data block of 128 16-bit or two-byte segments, which is sequentially read into the serial output bus for recording after every 128th segment position of a data track on a record strip.

The sequencer 290 includes a 15-position simultaneously clocked counter formed by a read/record data segment bit counter 291 and a read/record segment counter 292, an associated state decoder 293, and an auxiliary holding register 294.

During recording, the sequencer gates information from one of the data-holding shift registers 260 into the common serial bus. Upon completion of recording of a data segment, if a recording error in the segment has been registered, transfer to remedial action is initiated. In that event, data from the character-composing shift registers 270, which contain the previously recorded data segment, must again be gated into the serial bus for rerecording. Upon completion of rerecording of the data segment, the sequence takes up at the point of interruption. In addition, the read/record segment counter 291 and decoder 293 sequentially read out the contents of the accumulator portions 282 and 283 into the serial bus to record the accumulated algebraic check sum at the end of each 256-byte (eight-bit character) string.

During reading of data from the record strips, the sequencer shifts information from the read-to-verify register 263 into one of the data-holding shift registers 260. When one of the shift registers 261 and 262 is full, the sequencer transfers the shifting of data into the other and initiates a data ready signal to indicate to the recorder control subsystem that data is available to be transferred. If a recording failure indication appears in the verify signal position following a retrieved data segment, the sequencer interrupts shifting of information from the read-to-verify shift register 263. The sequencer also performs a comparison of the algebraic check sum accumulated during readout of data segments with the previously recorded algebraic check sum currently read out for each 256-byte (eight-bit character) string or block of data in order to set an error signal if an inequality is detected during the check sum comparison.

The check sum comparator 300 is a logic block which is composed principally of exclusive OR blocks whose output will be one any time the inputs differ logically. Control of the check sum comparator 300 is assigned to the read/record segment counter 292 and associated decoder which enable the output of the comparator to be transmitted to the error detect logic only during the readout of a recorded algebraic check sum from the accumulator portions 282 and 283 of the arithmetic system 280.

The timing and verify data-stripping section 301 logically removes or strips the clocking and verify signals which were interleaved with the data during recording, without causing any modification in the retrieved data. Stripping or removing of timing and verify signals is executed under supervision of the sequencer which maintains synchronism of events. Timing signals extracted from the output data stream are supplied to the timing generator 302. The timing signals provide a reference clock for comparison with the output of a voltage-controlled oscillator for error feedback control as heretofore described. The synchronized output of the voltage-controlled oscillator clock provides timing signals for the sequencer 290. Check sum verify signals for each 256-byte (eight-bit character) string recorded with the output data are fed to the check sum comparator 300. At the same time the data segment is fed to the character-composing shift resister 271 for generation of the logical sum of output data in the accumulator for comparison with the recorded check sum in the check sum comparator 300.

The read-to-verify shift register 263 is a 16-position shift register which provides intermediate storage for one data segment stripped of the clocking signals and check sum verify signal. The segment-verify bit signal associated with the segment bit is examined to determine whether the data segment currently in the shift register 263 was recorded without error, or if recording failure occurred during the recording of the segment. If the data segment is determined to be valid, i.e., error free, it will be shifted into whichever of the data-holding shift registers 260 is currently receiving verified retrieved information. If the data segment verified bit indicates the presence of an error within the data segment, remedial action is initiated to inhibit further transmission of the invalid 16-bit data segment to the recorder control subsystem.

During recording, the error detect and segment record/repeat logic 303 provides a continuous read-while-record logic check of the recording operation. As each bit is recorded, the recorded bit is compared with the input data bit to determine possible recording errors. Upon determination of a recording error, the logic circuitry initiates rerecording of the current segment until no error indications are detected. When an erroneous bit is detected during recording, the current segment is completed, however, to maintain synchronization and the entire segment rerecorded.

During recording the format control subsystem provides sequential data readout from the data-holding shift registers 260 to be interleaved with timing and verify signals for transmission to the laser recording unit to be permanently recorded on a record strip. Data from the data-holding shift registers 261 and 262 is continuously sequenced. When the contents of the least significant position of one of the data-holding shift registers is transferred, the sequencers then select the most significant position of the alternate data-holding shift register. When data is sequenced out of the least significant position of a holding shift register, a data request indicator is set causing the contents of the data duffer register 250 to be transferred to the then-vacant data-holding shift register. The schematic diagram of FIG. 18 illustrates a gating scheme employed to perform parallel to serial conversion of data being recorded.

During recording a data flow rate between the format control subsystem and the laser recording unit of, for example, 4 MHz., i.e., one data bit every 250 nanoseconds can be utilized. Such a flow rate in the embodiment of the invention described herein is satisfactory for data bit serializing, sequencing and transmission, read-while-record verification, error detection, and error registration within the available timing limits.

Auxiliary signals are interleaved with the input data during the recording operation to facilitate synchronous, error-free, verified data retrieval. A simple recording data format for a data segment of 16 information bits is as follows:

(bi)(bi+1)(bi+2)(bi+3)(bi+4)(bi+5)(bi+6)(bi+7) (T)
(bi+8)(bi+9)(bi+10)(bi+11)(bi+12)(bi+13)(bi+14)(bi+15) (T)(V)

The first eight data bits (bi) through (bi+7) are the most significant or leading data bits of the segment, T is a timing pulse, (bi+8) through (bi+15) are the least significant or trailing data bits of the segment, T is another timing pulse, and V is the verification bit which indicates whether or not the data segment is error free. Timing signals T are spaced apart by eight-bit characters or bytes, to provide what is referred to herein as the character-oriented clock, during retrieval. Every bit is read while recorded to provide immediate feedback verification of the validity of the recorded contents of each bit position. If an error is detected, the V bit at the end of the data segment in which the error occurred is set to a logical 1. In addition to the data segment verification bit, the format control subsystem includes a check on each block or string of data segments as an auxiliary data verification means when retrieving data after long periods of storage. This additional verification consists of recording an algebraic check sum after every 128th data segment position, of the characters comprising the preceding string of 128 data segments.

If during the recording of a 16-bit data segment an error is detected and registered in the recording of any particular bit within the segment, a remedial action request in initiated. Recording of the data segment is completed and the associated segment verification bit is assigned the value of a logical 1 which is then recorded to indicate that the segment contains a recording error and must be rejected during retrieval. To rerecord a segment containing a recording error, the contents of the data segment bit counter 291 of sequencer 290 are transferred to the counter auxiliary holding register 294, a remedial count is loaded into the data segment bit counter, and data is sequentially read out from the character-composing shift registers 271 and 272 into the serial bus and transmitted for rerecording of the data segment. At the conclusion of the remedial count, if no error is registered in the rerecording, the contents of the auxiliary holding register 294 are transferred back to the segment bit counter 293 and the recording operation returns to normal sequencing.

Recording of clocking and verification signals under control of the sequencer 290 is as follows: At each bit counter state multiple of eight, the bit counter halts counting for one or two counts depending upon which of the first or second timing signals, respectively, is being recorded, and a "1" is transmitted for recording. The data segment verification bit is recorded following the timing signal at the end of each data segment, thus accounting for the halt of two counts when recording the second timing signal. When the sequencer halts counting for two counts at the end of a data segment, the clocking or timing signal is recorded during the first count half and during the second count interval the status of the recording error flag is interrogated and transmitted for recording, a logical "1" indicating the presence of an error as heretofore described.

Recording verification is continuously monitored to assure that every recorded segment containing an error will be appropriately flagged so that at no time during retrieval will a data segment including an invalid bit be accepted.

The error-detect and segment-record repeat logic 303 of the sequencer includes capabilities to verify the initiation or termination of burning or laser ablation by the arrival of 1's; to verify that burning or laser ablation is not initiated or terminated by the arrival of 0's; and to verify that no burning or no laser ablation occurred appropriately in a 0 position. In order to accomplish these verification capabilities, the error-detect and segment-record repeat logic 303 retains memory of the initiation or termination of a burning or ablation event, compares static events such as the ablated record media as it should exist with transitory conditions such as the temporarily stored input data, and initiates remedial logical action to flag erroneously recorded data to prevent retrieval of the invalid information.

During data retrieval, the sequence of reading operations consists of receiving and holding output data optically read from the record strip wrapped around the drum, stripping the timing and verify signals from the output data, verifying the data, and assembling and transferring the data to the recorder control subsystem for transmission to a data processing system. These operations are performed sequentially and synchronously in a manner such that valid data segments are eliminated. As a data segment appears at the output of the timing and verify data stripping section 301, it is routed to the read to verify register 263 and temporarily held there until the value of the attended data segment recording verification bit is examined. The data segment verification signal following each data segment is removed from the data stream after examination to determine whether or not the segment includes a recording error and thereby whether or not the data segment is to be transmitted further. If the bit at the verify position has a logical 0, indicating that the segment is free from recording errors, the data segment propagates into one of the data-holding shift registers 260 currently being sequenced to receive data. If the bit at the data verify position has a logical value of 1, the retrieved data segment contains an error and a remedial action request occurs to inhibit further propagation of the invalid data segment. The remedial action consists of reducing the sequence counter by 16 (number of bits per segment), disarming the data-holding shift register shifting control, reading the data segment next following the segment containing an error into the read-to-verify shift register 263, and verifying the new segment. If the new segment following the data segment containing an error is indicated as valid, the normal read sequencing resumes. When one of the data-holding shift registers 261 and 262 is completely loaded with a valid data segment, the sequencer 290 transfers its shifting control to the other data-holding shift register and a ready flag is set to notify the recorder control subsystem and computer data processing system of data availability.

During the readout of a string or block of data segments, an algebraic check sum is generated by adding the logical value of all valid characters within the string or block. This algebraic check sum which is accumulated and retained in the accumulator sections 282 and 283 is compared with the algebraic check sum previously recorded and appended at the end of the string or block when it was recorded to thereby obtain an additional verification during retrieve operations.

During recording operations, data maneuvers are synchronized via a clock derived from a high-accuracy crystal-controlled clock oscillator with a nominal frequency of, for example, 16 MHz. During reading operations, timing signals stored with the recorded data and stripped therefrom are compared with a voltage-controlled clock oscillator output to derive a correction or feedback voltage for synchronizing the voltage-controlled oscillator with the reference character oriented clock stripped from the output data. A second source of clock synchronization during readout can be obtained by initiating the generation of revolving subclocks by the stripped clock signals which are compared with the crystal-controlled oscillator.

In order to provide maximum dependability in the high-density permanent data storage system, additional auxiliary logic is included in the format control subsystem to perform thorough closed loop diagnostic tests of all logical features and characteristics. Evaluation of the logical functions of the format control subsystem for handling data traffic between the recorder control subsystem and computer data processor and the laser recording unit is thereby permitted. During a diagnostic mode, the auxiliary diagnostic logic is arranged to simulate a recording/reading operation. As data is received from the data panel of a computing system it will follow a normal sequence recording path. However, the data transmission is diverted from the laser recording unit and is, instead, directed through a closed loop within the format control subsystem. A simulated retrieval is thereafter performed which concludes with the transfer of data back to the computer system to be examined for evaluation of the operation of the format control subsystem.

DATA TRACK FORMAT

As heretofore described in the preferred embodiment of the present invention, data received by the laser recording unit is recorded in the form of bits ablated in an energy-absorbing information storage medium formed in the configuration of an elongate strip suitable for wrapping around the periphery of a rotating drum. Diffraction-limited bits are permanently evaporated in the recording medium by the modulated coherent laser radiation in the form of parallel tracks running the length of the elongate recording medium strip and spaced across the strip. The tracks can be spaced, for example, 8 microns apart providing a track density of 3,175 parallel tracks per inch across the record strip. Data bits to be inscribed along each data track are spaced 4 microns apart at the center permitting a bit density of approximately $1.9\times10^5$ bits per track on a recording strip having a length of approximately 31¼ inches. The format control subsystem performs the function of controlling the format of data as it is recorded in tracks along the high-density permanent data storage strip. One example of a track-recording format or organization in which are combined all signals auxiliary to the input data is shown in FIG. 19 comprised of FIG. 19A and FIG. 19B.

At the beginning or track start 401 of a data track 400 recorded on a record strip mounted around the periphery of the recording drum, the timing synchronizing sector 402 is first recorded with two coordinating patterns, namely, a sequence 403 of all 1's and a sequence 404 of 1's separated by 0's. The timing synchronizing sector at the beginning of the track permits synchronization of clocks controlling the reading and writing operation. Thus, the initial sequence of 1's is employed to accelerate the synchronism between the character-oriented clock read from the output data and a voltage control clock by performing repeated comparisons to accurately measure the occurrence of time differences therebetween and thus generate a fine error feedback control of the voltage control oscillator. The character separated 1's are compared with a countdown clock derived from the voltage control oscillator to establish synchronism within longer intervals and generate a secondary feedback signal to obtain further period control adjustment of the voltage control oscillator if necessary.

Following the timing synchronizing sector 402, a diagnostic pattern is utilized to determine whether or not the retrieval logic is performing correctly, i.e., whether or not the data retrieval, holding, verification, stripping and transmission functions are exercised without circuit fault. The diagnostic pattern 405 consists of a sequence 406 of 1's and 0's, sequence 407, 0's and 1's, and sequence 408 of all 1's. Following the diagnostic pattern 405 is a track identification sector 410 on which is recorded an address to aid in determining the location of a selected track during data retrieval. The track identification pattern or address 411 avoids any ambiguity in track determination and is followed by a duplicate track identification sector 412 by which the pattern or address 411 can be repeated. Following the track identification sectors the first data block or string of 128 16-bit data segments is recorded. Each data segment is thereby formed of two bytes or characters. Each data segment 416 in the data block 415 includes a sequence of bits S1 through S8, timing signal T, bits S9 through S16, timing signal T, and data segment verification bit V as heretofore described. At the end of a string or block of 128 data segments, a check sum 420 is recorded. The check sum is a two-byte data segment in the same configuration as the data segments of the data block and has logical value equal to the logical sum of the characters of the 128 preceding data segments of the data block. The two-byte oriented check sum 421 is retrieved during reading to be compared with a sum being registered and stored in the accumulator of the arithmetic system in the format control subsystem. After a complete examination and comparison the check sum is stripped from the output data and disregarded.

The data track thereafter consists of alternating series of data blocks or strings 425 and check sums 426 until the end 430 of the data track is reached. As an alternative to the check sum format verification described above, cyclic check characters may be specified or one of several types of error-correcting codes as is known in the computer art, may be generated in the recorder control subsystem for inclusion in addition to or as a replacement for the check sum.

The data formatting and handling during laser recording and retrieval heretofore and hereinafter described can be used in laser recording medium and apparatus configurations other than that described above. As one example, U.S. Pat. No. 3,314,075, entitled "COHERENT LIGHT BEAM RECORDER," issued on Apr. 11, 1968 and assigned to the assignee of the present case, describes a laser recording medium in the form of a tape and apparatus for recording and reading oblique data tracks along the tape. As another example, the laser recording medium can be formed in the configuration of a disk for stacking and loading in a manner analogous to that used in a record player. According to this configuration, the optical record/read head traverses radially across the surface of the disk while the disk rotates. Helical data tracks, concentric circular data tracks, or radial data tracks can be used.

RECORDER CONTROL SUBSYSTEM

The recorder control subsystem 60 shown in the detailed block diagram of FIG. 20 is composed of a programmed processor which is interfaced with the format control subsystem 20, the data channel of a large-scale data processing system 400, and other peripheral units including a magnetic tape handling system 410 and teletype writer 420 with associated teletypewriter controller 421. The programmed processor consists of arithmetic sections, a control unit, holding registers, a core memory and an address control for the core memory. The programmed data processor is a very high-speed system controller designed to perform all laser recording unit reading and recording functions as heretofore described, including online control, data-gathering process monitoring, data-formating data validation and reduction, and a wide variety of operations requiring the handling of data in real time. The processor is a binary 16-bit system control unit whose general characteristics include fully parallel organization, indexing, and direct or indirect memory addressing. The internal logical structure of the processor includes a common bus structure 430 to couple information between the programmed processor elements, namely, the central arithmetic section 440, index arithmetic section 460, holding registers 470, address control 480 for the core memory 490, and control unit 500. The programmed processor performs arithmetic, indexing, logical, transfer, shift, test, and input/output operations in response to a sequence of commands stored in protected addresses of the core memory 490. The central arithmetic and index arithmetic sections 440 and 460 are high-speed computing units whose speeds are enhanced by utilizing high-speed holding registers 470. The holding registers are fast memories where operands, results, routines, programs and status words pertinent to a current or immediate process or program can be stored or fetched to maintain a high-speed processing flow. For example, the high speed of the arithmetic sections will allow generating a 12-bit sum or difference of two operands in 180 nanoseconds, a 24-bit product of two 12-bit operands in less than 2 microseconds, and a 12-bit quotient corresponding to a 24-bit dividend and a 12-bit devisor in 2.2 microseconds. Memory addressing may be directly indexed, indirectly indexed, or not indexed at all. Indexed addressing is possible both before, after, or before and after indirect addressing. These addressing tasks are performed by the index arithmetic section 460 and the core memory address control 480.

Turning in more detail to the elements of the program processor, the central arithmetic section 440 is the operating center of the processor. It consists of a 12-bit accumulator 441 for holding the intermediate or final numerical results of arithmetic operations, a 12-bit M–Q register 442 for holding operands or minors, numerical results of arithmetic operations, a 12-bit adder 443 with both carry-save and carry-propogate (i.e., sectional skip and sectional select) capabilities and a 12-bit N-register 444 used to receive and hold an operand during an arithmetic operation. Appropriate gates are provided associated with each of the elements, and a sign control 445 follows the accumulator 441. Through the common bus 430, the accumulator 441, the M–Q register 442, and the N-register 444 can receive data from either the core memory 490, the data-holding register 470, program address register 481 hereinafter described, or the input/output interfaces. Also, through the common data bus 430, the accumulator 441 and M–Q register 442 can transmit data to the core memory 490, holding registers 470, index arithmetic unit 460, N-register 444, program address register 441 and the input/output interfaces.

The index arithmetic section 460 is used to modify the operands or the operand address of an instruction as a direct consequence of the status of certain address control bits of the instruction and includes an X adder and several registers. The contents of the 12-bit X1 index register 461, which form a 12-bit base address, are added to the value in the displacement field in an instruction to form the effective preindex address of a memory reference instruction, when the reference address control bit of the instruction is logically 1. This is effectively preindexing the contents of the 12-bit X2 index register 462 are added to the value of a direct address to form the effective address for an instruction when the index address control bit is logically 1. Such indexing is performed after indirect addressing. This is effectively postindexing. The index adder 463 has both sectional carry skip and section carry select features to obtain carry propogation in very short times. The XN register 464 receives and holds operands during an index instruction. Appropriate gates are associated with these elements. The X1 index and X2 index registers and the XN register can receive data from the core memory 490, a selected one of the operand-holding register 470, the central arithmetic section 440, or the program address register 481 via the common bus. The contents of the X1 and X2 index registers can be routed to the core memory 490, a selected one of the operand-holding register 470 or the program address register 481.

The structure of the holding register 470 for the programmed data processor consists of 16 high-speed registers 471 having a capacity of 12 bits each, in order to provide high-speed storage during an operation. The holding registers provide storage for operands, intermediate and final results, a suspended program address, program routines, index numbers, and input/output data transfers between peripheral units. Data transmission between the holding registers and various possible destinations is accomplished via the common bus 430. The holding register structure increases the capacity and efficiency of the core memory by eliminating core memory traffic for operands which have immediate participation in the present operation. The holding registers also provide a high-speed storage for the contents of a key register when an operation is interrupted, and for high-speed restoration of the contents to the key register when the operation is subsequently resumed.

The core memory address control 480 provides addressing for the program instruction sequence in the core memory 490, for fetching operands, and for routing data to and from the memory. The program address register 481 contains the address of the instruction about to be or currently being executed. It is normally incremented by one after the execution of each instruction or by two is executing a skip instruction. A jump instruction can set the program address register to any memory core location. The contents of the program address register 481 can be transferred through the common bus between the program address register and any selected holding register, thereby simplifying interruption of the execution of a program instruction sequence when either branching, status switching, or interrupt conditions exist. After an instruction is fetched from the core memory, the address control bits are logically examined by the address control logic 480 to determine if the operand address is one of the following: nonrelative; preindexed, i.e., base relative; self-relative; direct or indirect; postindexed; or holding register resident. The X1 index register, one of the holding registers, and the X2 index register which hold the 16-bit preindexing, self-relative, and postindexing values, respectively, are used to determine the operand effective address.

Control unit 500 includes an instruction register 501 and instruction decoder 502 and the instruction execute control 503. Instruction register 501 receives and holds the operation code until the instruction is decoded and the instruction execute control armed. The instruction decoder 502 interprets or decodes the instruction code into mutually exclusive accounting commands, which in turn activate the logical elements in the instruction execute control 503 to generate and distribute timing pulse sequences to effect system response.

The core memory 490 is composed of up to three memory module units, each with a capacity of 4,096 of the 16-bit data words. The memory module may be, for example, a Honeywell ICM–47 or an EMI–2900. If the data channel of the data processing system with which the laser recording unit is to be used can handle data at rates faster than 5000,000 bytes per second, the maximum transfer rate required by the laser recording unit, the core memory of the programmed processor need provide storage only for the internal programs of the processor and for working storage. In that event, only one core memory core module is required. If more elaborate search, data comparison, or data transfer features are desired for the system, additional modules of core memory can be added to the programmed processor. Such additions would permit, for example, transfer of an entire track of data or other convenient sizable blocks to or from the core memory of the program processor.

The data processing system data channel 400 with which it is contemplated the laser recording unit, format control subsystem, and recorder control subsystem, will be used, can be any one of a variety of large-scale computing or data processing systems such as the control data 6,400–6,600. The programmed processor of the recorder control subsystem heretofore described is particularly suitable for that system. A similar recorder control subsystem to interface with, for example, an IBM 360–75 would require programmed processor registers with a capacity of 16 bits instead of 12 bits, and a modified channel interface.

As shown in the block diagram of FIG. 21, the large-scale data processing system 400 with which the recorder control subsystem is interfaced through interface 401 consists of channels 402 and 403 and central processing unit 404. The interface 401 permits 12-bit parallel transfers between input/output channel of the program processor of the recorder control subsystem and the data channel synchronizer for the data processor 400 which may be, for example, a 6,400–6,600 control data computer system. The input/output channels from the recorder control subsystem operate from a common bus 430, so that additional input/output channels may be provided.

A teletype unit 420 and associated equipment, including the information controller and interface 421 is connected to the programmed processor through buffered word channel 422. The teletype unit 420 is used by checkout and maintenance personnel for three primary operations: bootstrapping the programmed processor into operation; making minor processor program modifications; and obtaining diagnostic test indications as a self-contained output device. The teletype unit may be, for example, an ASR—33 teletype unit and is provided for convenient off-line maintenance and operation of the laser recording unit.

A digital magnetic tape handler 410 is also connected to the programmed processor through buffered word channel 422. The magnetic tape data handling system includes a magnetic tape unit 411 and controller 412 used for checkout and maintenance purposes, for program loading to the programmed processor of the recorder control subsystem, and for use as a data source and data repository for off-line laser recording unit maintenance and diagnostic procedures. The magnetic tape handling system may be, for example, a TI–50 data-handling system, and a TI–1207 or 1209 magnetic tape handler. Inputs from other peripheral units may be connected to the program processor through the DMA channel and input/output control 425. The magnetic tape handling system, teletype unit, and other peripheral devices can be removed and stored if desired after the laser recording unit is installed and operational.

The interface 450 between the format control subsystem 20 and the program processor of the recorder control subsystem 60 permits word parallel transfers between the data buffer register of the format control subsystem and a common bus 430 of the programmed processor. The major types of data transfers through this interface include data to be recorded, retrieved data, read calibration mode control data for track acquisition and compensation for skew mounting of a record strip on the drum, sequence control orders and data, and diagnostic control orders and data.

GENERAL SYSTEM DESCRIPTION

A broad picture of the high-density permanent data storage and retrieval system envisioned by the present invention is presented in the generalized block diagram of FIG. 21. According to this diagram the generalized mechanical and logical components or groups are interposed between the laser and optical subsystem of the laser recording unit 600 and the central processing unit 602 of a large-scale computer data processing system with which the laser recording unit is to be used. Control and sequencing of the various operations of the laser recording unit are dictated by a programmed processor which in the block diagram of FIG. 22 consists of a control processor 604 and a data word processor 606. Control processor 604 is a small digital computer having subsystems for sequence control of laser recording unit operations, for read calibrate control to acquire the appropriate track on a laser recording unit recording strip and to synchronize the reading or recording operations, and for track following once the appropriate track has been acquired. For operational diagnostic and test routines, the control processor is interfaced with the magnetic tape handling unit, teletypewriter unit, or other peripheral units through interfaces 608. Data word processor 606 is a small high-speed processor for performing operations and transmitting input and output data words at the rate of, for example, 500,000 bytes per second. During recording input data passes through the data word processor 606 and is interleaved with the error detect or verification signals and clocking signals for permanent recording by the laser recording unit on a record strip. During readout of stored data, the output data passes through the data word processor where the clocking signals and error detect or verification signals are stripped from the output data for transfer to the CPU 602 of the large-scale data processing system with which it is being used. The data word processor 606 includes subsystems for generation during recording and comparison during readout of error detect words, for generation during recording and comparison during readout of track sector and identification words, and for formating data in word-oriented form.

Immediately associated with the laser recording unit are the following groups. Mechanical selector 610 accesses the desired record strip for recording or reading and positions if for loading on the drum according to addressing from the programmed processor which may be analog or digital. The drum load/unload assembly 612 includes the apparatus for loading and retaining a record strip around the laser recording unit drum and for unloading a record strip therefrom for return to an appropriate address by the mechanical selector 610. The drum speed control and drive unit 614 provides servocontrol of the drum speed by means of an optical tachometer sensor and a reference clock signal as heretofore described. Linear position 616 is a translating carriage under servocontrol on which are mounted the optical record/read head and galvanometer mirror as heretofore described. Positioning of the linear positioner 616 across the face of laser recording unit drum is controlled by addresses received from the programmed processor. Tracking servo 618 provides analog servocontrol of a mirror galvanometer for centering the laser beam on a record strip data track as heretofore described. The intensity control 620 for the laser is accomplished by an analog servo driving signal for the optical modulator as heretofore described. The data sense group 622 provides optical readout of data stored in a laser recording unit record strip for transfer to the data word processor 606. Bit clock generator and synchronizer 624 is a digital unit which provides timing signals for the programmed processor for use in sequence control as heretofore described. Finally, the data write group 626 is an analog optical modulator and a drive unit for modulating the light output from the laser of laser recording unit 600. For purposes of appropriate sequencing of operations, the control processor 604 senses and monitors the status of each of the elements 610, 612, 614, 616, and 624. Address requests from the control processor to the linear positioner 616 and tracking servo 618 are supplied through a digital-to-analog converter.

Interface 630 provides appropriate matching between the data channel of CPU 602 and the control processor 604 and data word processor 606.

The read-while-write corrector 632 continuously monitors the recording operation via the data sense group 622 for comparison with the input data in order to detect recording errors.

Program instructions for conducting operations of the laser recording unit and associated group are stored in the control processor. During online operation the control processor 604 must be able to handle, for example, over 100,000 programs per second. The data word processor 606 handles the inflow and out-flow of byte-oriented input/output data and interleaved signals at a rate of, for example, 500 kilobytes per second. Instruction processing rates of four to eight per microsecond are required for such a data flow.

The general operational steps during the laser recording unit record and read processes are shown in the simplified flow diagrams of FIGS. 22 and 23. In describing these steps, reference is made to the elements of the block diagram of FIG. 21.

During the recording process, input data and the track and record strip address at which it is to be recorded are received by the control processor 604 and data word processor 606. The record strip at the appropriate address is accessed by the mechanical selector 610, and the record strip is loaded on the drum by the drum load/unload mechanism 612. The drum is accelerated to and maintained at the correct speed by the drum speed control and drive unit 614, and the record/read head is thereafter translated across the peripheral surface of the drum to the correct track address by linear positioner 616. The tracking servo 618 which includes the mirror galvanometer is operated in the record mode. According to this mode, the galvanometer mirror is deflected in a sawtooth waveform motion while the linear positioner 616 translates the record/read head at a uniform velocity across the face of the rotating drum. The slope and frequency of the sawtooth waveform motion of the galvanometer mirror which deflects the laser beam is synchronized with the speed of rotation of the drum to produce parallel circular tracking lines longitudinally across the record strip, so that upon removal of the record strip for storing in a flat configuration, the data tracks form a row of longitudinal parallel lines across the record strip.

At the same time, clock and sequencing signals are generated by the bit clock generator and synchronizer 624, special track sector start and identification patterns are generated by the data word processor, and finally error detection words and signals are generated by the data word processor 606. Each of the signals is then interleaved with the input data by data word processor 606 for recording of the interleaved input data and clocking verification signals at the proper location on the address track by the data write group 626. During recording data, intensity is maintained by the intensity control group 620. Also, during recording, a simultaneous read-while-write error check is performed by the data sense group 622 and read-while-write corrector 632. In the event of a recording error, the data segment in which the recording error was detected in rerecorded until it is error free. After recording of the input data is completed, the drum speed is reduced, and the record strip unloaded and returned to its appropriate address in the file by the control processor 604 in conjunction with the drum speed control and drive unit 614, drum load/unload 612, and mechanical selector 610.

Referring to FIG. 23, retrieval of data is initiated by the receipt and storage in the control processor of an access request for a block of data at a particular track and strip address. The mechanical selector 610 accesses the addressed record strip for loading of the record strip onto the drum by the drum load/unload mechanism 612. The record drum is then accelerated to the correct rotation speed for retrieving data and the laser recording unit is adjusted for the read calibrate mode as heretofore described. According to this mode, the extent of axial offset or skew in the mounting of the record strip around the drum is determined by reading the addresses of tracks encountered as the laser beam traverses across the abutting ends of the record strip. Data corresponding to the extent of axial offset due to nonalignment of the abutting ends of the record strip is stored, for adjustment of the sawtooth motion of the galvanometer mirror in the tracking servo 618, so that appropriate tracks are sequentially acquired as the laser beam traverses the intersection of the ends of the record strip during each revolution of the drum. The record/read head is translated by the linear positioner 616 to the vicinity of the track address and the tracking servo 618 is operated and the read mode. According to this mode, the reflective readout beam from the record strip is bifurcated to provide a pair of beams from which a different signal is generated for closed loop feedback control of the galvanometer mirror interposed in the light beam path. According to this mode, once a track is acquired, the galvanometer mirror directs the laser beam centrally on a prerecorded data track. In operating in the read mode, it is first determined whether or not the tracking servo, referred to in FIG. 23 by the abbreviation, T.S., is centered on a data track or positioned between tracks. When the tracking servo has entered the laser beam on a data track, the bit clock generator synchronizer 624 synchronizes the clock with the clocking signals read out from the acquired data track. The synchronized clocks are utilized, among other things, to maintain the desired drum speed for the read mode. Following the clocking signals from the data track, the data word processor 606 receives the sector start pattern and determines the track and sector number. If the correct track has been acquired, the data word processor determines when the desired track data sector starts. If the correct track has not been acquired, the control processor calculates the tracking servo input necessary to go to the correct track. This is accomplished by deflection of the mirror galvanometer by the track servo 618. When the correct track has been acquired, and the start of the addressed data tracks sector determined, the requested block of data is read out from the record strip by the data-sensing group 622. Clocking and verification signals are stripped from the output data by the data word processor 606 and the verification signals or error detect words checked in order to determine the occurrence of errors in the output data. If the check sum error detect signal does not check, the tracking servo is controlled to reread the data until the recorded check sum error detect signal compares with the generated sum. Format information is thereafter removed from the output data by the data word processor 606 and the output data stored by control processor 604 for external formating by the external CPU interface 630 for transmission to CPU 602. The drum speed is then reduced, the record strip is unloaded and returned to its appropriate address in the index file. Throughout the reading process, the intensity control of the laser or reading light source is maintained by intensity control 620.

What is claimed:

1. A digital data processing system for transferring input data from a data channel of a computing system or from temporary storage to a high-density permanent data laser recording medium and for nondestructively reproducing data stored in the high-density permanent data laser recording medium for transfer of output data to a computer system data channel or to temporary storage comprising: buffer storage means for receiving input data for laser recording on the high-density permanent data storage medium and for receiving output data retrieved from said high-density storage medium; clock means for generating synchronous clock signals; logic circuit means coupled to said buffer storage means for receiving input data and for generating data verification signals for said input data; first logic control means having inputs coupled to said clock means, logic circuit means, and buffer storage means for interleaving the synchronous clock signals and data verification signals with the input data, said first logic control means having an output for delivering the interleaved data and signals for laser recording; laser recording and reading means for recording the input data and interleaved synchronous clock and data verification signals on the high-density permanent data storage medium and for reading the stored signals, the output from said first logic control coupled with said laser recording and reading means; and second logic control means coupled to the laser recording and reading means for removing the synchronous clock and data verification signals from output data retrieved from high-density permanent data storage medium by said laser recording and reading means, sensing the verification signals, and initiating remedial action in the event that a verification signal indicates the presence of erroneous data, said second logic control means having an output coupled to the buffer storage means for transferring said retrieved data to said buffer storage means.

2. A digital data processing system as set forth in claim 1, wherein said second logic control means includes means for comparing data as it is recorded in the high-density permanent storage medium, with the input data to detect the occurrence of recording errors and for initiating remedial action upon detection of a recording error, said remedial action comprising recording an error indication signal in association with the erroneous data and rerecording the data in correct form.

3. A data processing system as set forth in claim 2, wherein said data verification signals comprise a first signal associated with each data segment of predetermined length, said first signal indicating the presence or absence of a recording error in the corresponding data segment and wherein said data verification signals comprise a check sum second signal associated with each string of data segments of predetermined length and wherein during retrieval of stored data said remedial action comprises eliminating each data segment in which a recording error is present as indicated by the first data verification signal whereby an accurately rerecorded data segment following the eliminated data segment can be transferred to said buffer storage means and wherein said remedial action also comprises flagging with a warning signal, a string of data segments in which said check sum second data verification signal indicates the occurrence of an error.

4. A digital data processing system as set forth in claim 3 wherein is provided computer processor means coupled with the elements of said digital data processing system for sequencing operations during recording and reading of data and wherein said synchronous clock means provides timing control signals for said computer.

5. A digital processing system as set forth in claim 4 wherein is also provided a voltage-controlled oscillator for providing timing control signals for said computer processor means during readout of stored data, wherein the retrieved synchronous clock signals removed from the data retrieved from the high-density permanent data storage medium provides a reference clock and wherein said voltage-controlled oscillator is synchronized to the reference clock by means of error voltage feedback.

6. A digital data processing system as set forth in claim 3 wherein said logic control systems, logic circuit means and buffer storage means are connected to a common bus for serial transfer of data and wherein computer processor means is provided coupled with said digital data processing system elements for regulating the sequence of data transfers during recording and reading of data.

7. A digital data processing system as set forth in claim 4 wherein said synchronous clock means comprises a crystal-controlled oscillator, said crystal-controlled oscillator also providing timing control signals for the computer processor means.

8. A digital processing system as set forth in claim 5 wherein there is also provided a voltage-controlled oscillator for providing timing control signals for said computer processor means during readout of stored data, wherein the retrieved synchronous clock signals removed from retrieved data from the high-density permanent data storage medium provides a reference clock and wherein said voltage-controlled oscillator is synchronized to the reference clock by means of error voltage feedback.

9. A digital data processing system as set forth in claim 4 wherein there is further provided self-checking diagnostic circuit means for detecting and localizing malfunctions in the logic circuit means, logic control means and computer processor means.

10. A digital data processing system for transferring input data from a data channel of a computing system or from temporary storage to a high-density permanent data laser recording medium and for nondestructively reproducing data stored in the high-density permanent data laser recording medium for transfer of output data to a computer system data channel or to temporary storage comprising: buffer storage means for receiving input data for laser recording on the high-density permanent data storage medium and for receiving output data retrieved from said high-density storage medium; logic circuit means coupled to said buffer storage means for receiving input data and for generating data verification signals with the input data, said first logic control means having inputs coupled to said logic circuit means and buffer storage means for interleaving the data verification signals with the input data, said first logic control means having an output for delivering the interleaved data and signals for laser recording; laser recording and reading means for recording the input data and interleaved data verification signals on the high-density permanent data storage medium and for reading the stored signals, the output from said first logic control coupled with said laser recording and reading means; and second logic control means coupled to the laser recording and reading means for removing the data verification signals from output data retrieved by said laser recording and reading means from the high-density permanent data storage medium, sensing the verification signals, and initiating remedial action in the event that a verification signal indicates the presence of erroneous data, said second logic control means having an output coupled to the buffer storage means for transferring said retrieved data to said buffer storage means 11. A method of processing and transferring data between a computing system or temporary storage and a high-density permanent data laser recording medium comprising:

generating input data for laser recording;

generating synchronous clock signals;

generating data verification signals;

interleaving said synchronous clock signals and data verification signals with said input data;

recording said interleaved input data and synchronous clock and data verification signals on the high-density permanent data storage medium;

retrieving data from said laser recording medium;

stripping said synchronous clock and data verification signals from the output data retrieved;

sensing the verification signal to determine the possible presence of erroneous output data;

initiating remedial action in the event that a data verification signal indicates the presence of erroneous data; and transferring the output data to buffer storage.

12. A method of processing and transferring data as set forth in claim 11 wherein is provided the additional step of providing a reference clock from said stripped synchronous clock signals.

13. A method for recording data on a high-density permanent data optical recording medium comprising:

generating input data signals;

recording said input data signals;

reading and monitoring input data signals during recording to determine the existence of recording errors;

generating recording error signals;

interleaving said recording error signals with said input data signals;

recording said interleaved recording error signals; and rerecording the input data signals in the event a recording error occurs until the input data is correctly recorded.

* * * * *